US008868538B2

(12) United States Patent
Mital et al.

(10) Patent No.: US 8,868,538 B2
(45) Date of Patent: Oct. 21, 2014

(54) INFORMATION PRESENTATION SYSTEM

(75) Inventors: Vijay Mital, Kirkland, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 12/765,465

(22) Filed: Apr. 22, 2010

(65) Prior Publication Data

US 2011/0264645 A1  Oct. 27, 2011

(51) Int. Cl.
*G06F 17/30* (2006.01)
*G06F 7/00* (2006.01)
*G06F 3/0482* (2013.01)
*G06Q 30/06* (2012.01)

(52) U.S. Cl.
CPC ........ *G06F 3/0482* (2013.01); *G06F 17/30483* (2013.01); *G06F 17/30997* (2013.01); *G06F 17/30699* (2013.01); *G06F 17/30864* (2013.01); *G06F 17/30722* (2013.01); *G06F 17/30* (2013.01); *G06F 17/3028* (2013.01); *G06Q 30/06* (2013.01); *G06F 17/30867* (2013.01); *G06F 17/30038* (2013.01)
USPC ............................ 707/708; 707/803; 715/810

(58) Field of Classification Search
CPC .................... G06F 17/30867; G06F 17/30864; G06F 17/30; G06F 17/30483; G06F 17/30722; G06F 17/30038; G06F 17/3028; G06F 17/30699; G06F 17/30997; G06F 9/5038; G06F 9/5066; G06F 9/526
See application file for complete search history.

(56) References Cited

U.S. PATENT DOCUMENTS

| | | | |
|---|---|---|---|
| 6,968,333 B2 | 11/2005 | Abbott et al. | |
| 7,360,171 B2 | 4/2008 | Ruthfield et al. | |
| 2005/0066281 A1* | 3/2005 | Abbott et al. | 715/740 |
| 2005/0086243 A1* | 4/2005 | Abbott et al. | 707/100 |
| 2005/0210024 A1 | 9/2005 | Hurst-Miller | |
| 2006/0136280 A1 | 6/2006 | Cho et al. | |
| 2006/0136393 A1* | 6/2006 | Abbott et al. | 707/3 |
| 2006/0136405 A1 | 6/2006 | Ducatel | |
| 2006/0156252 A1* | 7/2006 | Sheshagiri et al. | 715/825 |
| 2007/0022380 A1 | 1/2007 | Swartz et al. | |
| 2007/0022384 A1* | 1/2007 | Abbott et al. | 715/744 |
| 2008/0059909 A1 | 3/2008 | Parada et al. | |
| 2008/0147775 A1* | 6/2008 | Abbott et al. | 709/202 |
| 2009/0019369 A1 | 1/2009 | Borovsky et al. | |

(Continued)

OTHER PUBLICATIONS

Lewis et al., "Task-Centered User Interface Design—A Practical Introduction," available at: http://hcibib.org/tcuid/tcuid.pdf, 1993.

(Continued)

*Primary Examiner* — Dung K Chau
(74) *Attorney, Agent, or Firm* — Kevin Sullivan; Kate Drakos; Micky Minhas

(57) ABSTRACT

An information presentation system that identifies information of interest to a user based on identifying tasks that may be relevant to the user given the user's current context. The user may be presented with an option to select from among relevant tasks and/or goals of completing the task. For each selected task and goal, the system may generate one or more sets of items that are relevant to completing the task. The user may be presented with the option to select from among the sets of items or to navigate among the sets of items. Such a system may be used to provide an easy-to-use interface on a portable computing device to support shopping applications.

17 Claims, 12 Drawing Sheets

(56) References Cited

U.S. PATENT DOCUMENTS

| | | |
|---|---|---|
| 2009/0043738 A1 | 2/2009 | James |
| 2009/0113346 A1 | 4/2009 | Wickramasuriya et al. |
| 2009/0182622 A1 | 7/2009 | Agarwal et al. |
| 2009/0234909 A1 | 9/2009 | Strandell |
| 2009/0239552 A1* | 9/2009 | Churchill et al. .......... 455/456.3 |
| 2009/0271724 A1 | 10/2009 | Chaudhri et al. |
| 2009/0307162 A1 | 12/2009 | Bui et al. |
| 2011/0004524 A1 | 1/2011 | Paul et al. |
| 2011/0264645 A1 | 10/2011 | Mital et al. |

OTHER PUBLICATIONS

Herlocker et al., "Content-Independent Task-Focused Recommendation," IEEE Internet Computing, vol. 5, Issue 6, pp. 40-47, Nov. 2001.

Blackwell, et al., "Tangible Interaction in a Mobile Context," CHI 2007 workshop on Tangible User Interface in Context and Theory, San Jose, CA, Apr. 28, 2007.

Roto, "Browsing on Mobile Phones", 2005.

Kaasinen, "User Needs for Location-Aware Mobile Services", Per Ubiquit Comput, 7:70-90, 2003.

Lewis, C., et al., Task-Centered user Interface Design—A Practical Indroduction, retrieved at http://hcibib.org/tcuid/tcuid.pdf, 1993, 190 pages.

Herlocker, J. et al., "Content-Independent Task-Focused Recommendation", IEEE Internet Computing, vol. 5, Issue 6, Nov./Dec. 2001, pp. 40-47.

PCT Patent Application US2011/031141, International Search Report and Written Opinion, dated Sep. 28, 2011, 8 pages.

EP Application No. 11772416.1, Office Action dated Oct. 30, 2013, 5 pages.

EP Application No. 11772416.1, Search Report dated Oct. 17, 2013, 3 pages.

U.S. Appl. No. 12/765,408, Non Final Office Action mailed Jun. 25, 2012, 35 pages.

U.S. Appl. No. 12/765,408, Response to Non Final Office Action mailed Jun. 25, 2012, filed Aug. 22, 2012, 13 pages.

U.S. Appl. No. 12/765,408, Final Office Action mailed Dec. 21, 2012, 23 pages.

U.S. Appl. No. 12/765,408, RCE-Response to Final Office Action mailed Dec. 21, 2012, filed Apr. 22, 2013, 16 pages.

* cited by examiner

INFORMATION PRESENTATION SYSTEM

BACKGROUND

The widespread availability of computer networks has enabled people to access vast quantities of information. Computer networks, such as the Internet, can potentially connect a computer user to any of numerous sources of information. In this way, people can obtain information about any number of things, including products, services or events. Such information may be accessed for personal reasons or business reasons, making ready availability to such information useful through fixed computers or portable electronic devices.

A conventional approach to access information over a computer network is to use a search engine. The search engine develops an index of items conveying information that is available over a computer network in advance of a user's submitting a request for information. The items are in a format so that they convey information when requested by a computer user. The items, for example, may be files containing information or web pages that can be accessed over the computer network. When the search engine receives a query, representing a user's request for information about a topic, the search engine selects one or more items by matching items in the index to the search query and provides the items to the user.

A conventional approach to formulating a search query is to receive a text string input by a user. The text string may contain terms and operators defining relationships between the terms that characterize the items that are likely to be of interest to the user. For example, a search for information about camera accessories may include such terms as "camera," "tripod," "flash." Such a query may also contain terms that can more precisely focus the query on items of interest to the user, such as brand names or model numbers. These additional terms may be included in the initial search query or may be added in a series of iterations, as the user reviews results of a query and then modifies the query based on returned results.

To improve the likelihood that items returned in response to a search query provide information of interest to a user, filtering may be employed in connection with searching. Using filtering, the query or set of results returned by a query may be automatically modified by the search engine. Filtering may be based on information previously obtained about a user submitting the search and reveals categories of interest to the user. The search engine may apply the information to weight search results towards items that contain information about categories determined to be of interest to the user.

SUMMARY

A user experience in obtaining data is improved relative to conventional search systems by defining sets of criteria. Based on user-context information, one or more sets of criteria may be selected. The selection may be based on user input by providing the user with an indication of sets of criteria determined to be relevant based on the context information and accepting user input identifying one or more of the relevant sets of criteria.

In some embodiments, each set of criteria may be expressed as a model that characterizes information to be provided in response to a search query. A set of criteria may be selected by selecting a model from a set of models based on user context information, such as a search query from a user and/or data identified by a search engine in response to the search query. The selected model may be used to generate one or more data sets. Each data set may contain multiple items that are related in that the multiple items are collectively selected to satisfy the selected model.

In some embodiments, each of the data sets may relate to a collection of items. A model may contain a set of equations, and/or a set of inequalities or constraints such that data sets may be generated by solving the set of equations, and/or the set of inequalities or constraints.

The data sets may be presented to the user in a way that allows the user to navigate through the data sets, displaying only a portion of the possible data sets at one time. Moreover, the user may be presented with different options with respect to presentation of the data sets to the user.

In some embodiments, each set of criteria may be associated with a user-focused task. A selected set of criteria may be used to construct one or more data sets containing data that completes the task, as defined by the set of criteria associated with the task. As the user navigates through the data sets, the user may view, at different times, different collections of items, each of which completes the selected task.

In some embodiments, a task may be completed differently depending on a goal that may be identified based on the user context. The goal may be defined as a certain characteristic pertinent to the user, such as a level of a professionalism of a user, a purpose of completing the task and others.

Some of the collections of items that are returned by the system as above may fully satisfy the selected task, yet, some may satisfy the task only in some aspects or manners of the task but not all. In some embodiments, a task may be defined with a set of data attributes denoting a measure of how well a task is completed. The task may further contain expressions that operate over the data attributes of each returned collection of items, and may produce a merit score of how well in fact each collection completes the task.

In some embodiments, the user may see rankings of how well each collection of items satisfies the selected task in different aspects.

Such a system may be used in conjunction with a portable electronic device. The device may have a limited display area and limited input mechanisms, but the system can nonetheless obtain information in a format that is highly relevant for a user of the device. The system may first identify tasks possibly of interest to the user. Also, goals may be identified based on the user context. The system can present the identified tasks and, optionally, goals to the user through a simple display of choices and the user may make a selection of a task and/or goal by providing a simple input. The system can then provide information on data sets completing a selected task, given a selected goal, and the user can, also using simple inputs, navigate through sets that complete the task.

The portable electronic device may also provide inputs to the system that define user context. These inputs may be express user inputs, but may alternatively or additionally be derived from sensors, such as those that indicate a location of the device or an activity in which a user of the device is engaged.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
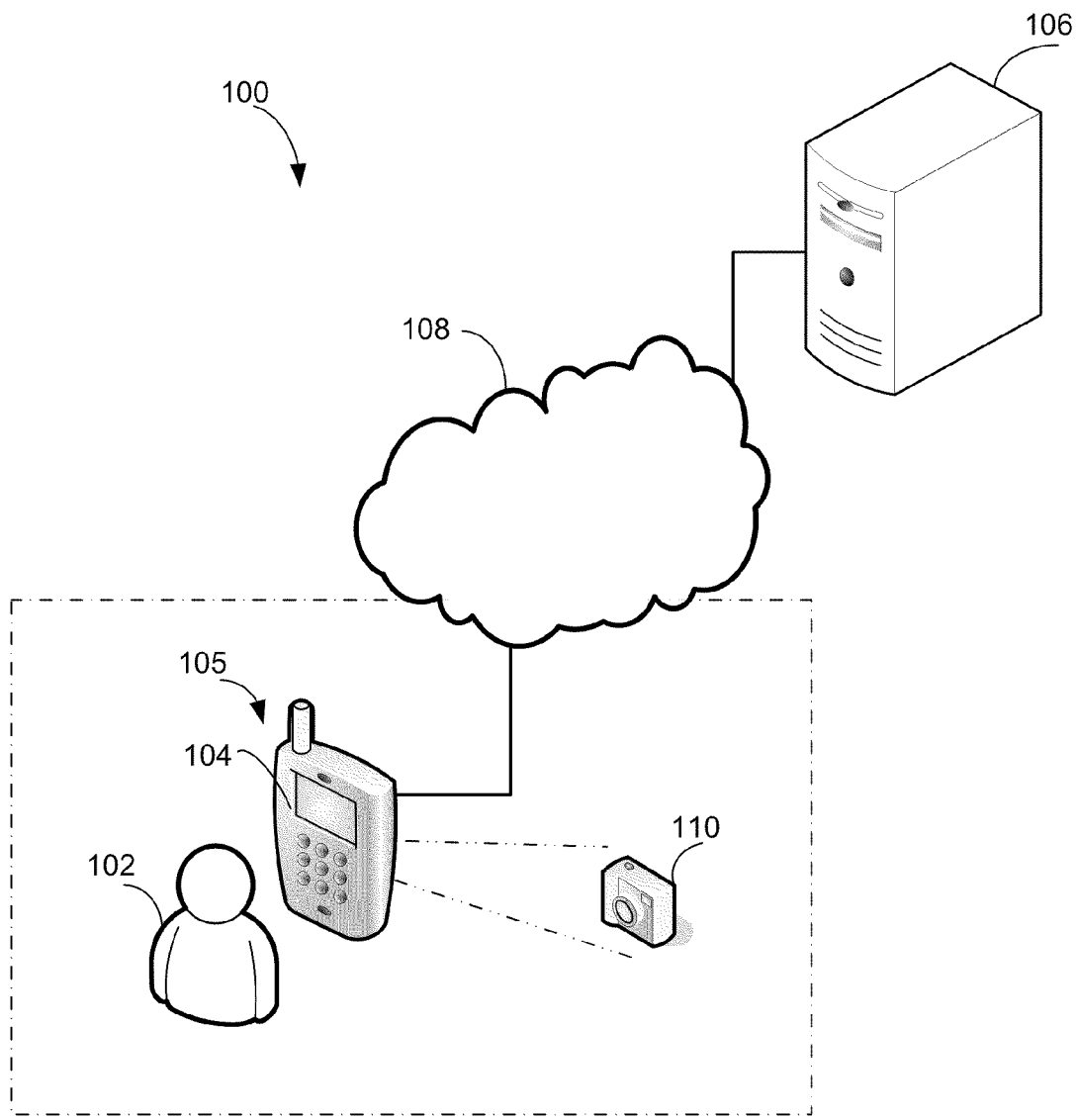
FIG. 1 is a high level block diagram illustrating a computing environment in which some embodiments of the invention may be implemented.

The inventors have recognized and appreciated that current information-presentation systems frequently do not provide information in a format directly relevant to a user or are hard to use, particularly for a user of a portable electronic device. Such systems, based on successively narrowing a search query through explicit or, in some instances, implicit user input, may not deliver results that align with user interests. For example, a user may not know the nature of information that responds to their current interests and, therefore, may be unable to formulate an appropriate search query to return that information. Moreover, input that successively narrows a search query may require more complex input than a user of a small, portable electronic device can easily supply or is interested in supplying.

A set of criteria associated with a task may be recorded in a model that may be shared across multiple users. By using such task models, the user need not be able to create a search query that returns information of interest. The tasks models may, for example, be defined by an administrator of the information-presentation system, by other users or by third parties, such as merchants, interested in helping users search for information. When the information retrieval and presentation system selects and applies a model, the system may generate one or more data sets that may be relevant to the user, even without express user input.

The inventors have recognized and appreciated that functionality and utility of search systems may be expanded by incorporating into a search stack of an information retrieval and presentation system components that can select and apply one or more models characterizing data to be provided to a user in the user's context. In response to a search query, or other input identifying user context, the system may identify a model to apply in generating information for the user. The model may be selected based on user context information, that may include the search query itself, or data relevant to the search query retrieved by a search engine based on the user context or other data that may define the user's context.

Once a model is selected, a model application engine may apply the model to generate information to be provided to the user. A model may include one or more elements, at least some of which define a computation to be performed based on data dynamically identified for the user's context. For example, application of the model may result in a computation that has inputs relating to terms in the search query or data generated by a search engine applying the search query. The output of the computation may be provided to the user as a result of the search query, either alone or in conjunction with data located by a search engine or other dynamically generated data.

In some embodiments, the computation may be based on an equation represented in the model. The equation may specify a mathematical operation to be performed on data that is dynamically identified by the search engine. Such a mathematical operation may include other data, such as user data obtained from a user profile or based on context information. Applying models in a search stack may greatly expand the type of information that may be returned to a user and may be applied in many different contexts.

As a result, knowledge useful in generating search results may be captured in models and shared across search systems. Further, by allowing the models to be applied in the search stack of a search system, models may perform computations or other operations based on data that is only available within the search system.

Regardless of how the sets of criteria are implemented within an information retrieval as presentation system, the inventors have recognized and appreciated that experiences of users of electronic devices may be improved by retrieving, via a network, from an entity, such as a server, information comprising multiple data sets determined to be relevant given the user's context. The retrieved information may be temporarily stored on the user's device. While only one or some of the data sets of the retrieved information may be presented to the user at a time, different data sets from the retrieved information may be presented in response to user input with respect to the retrieved data sets.

When a device requests information from the entity, such as a server, via a network connection, particularly, a wireless connection, it may take time to obtain the information. By retrieving data sets selected based on context, some or all of the multiple data sets can be retrieved in anticipation of the user providing an express input indicating interest to these data sets.

In some embodiments of the invention, information is presented to users as one or more data sets, each data set containing items that relate to a task that is inferred to be of interest to a user. The items in a data set may also relate to one or more goals associated with the task. For example, when context information indicates that a user is looking for information to buy a camera, a task may be to find information about cameras. A goal of completing the task may include finding information about a camera that is suitable for taking close-up pictures that define information that completes a task and, if applicable, a goal. These criteria may be applied to select a data set from one or more information sources. User context information may be used to select an appropriate set of criteria, defined as a model. In many instances, there may be multiple data sets that match criteria selected for a user context. When multiple data sets match the criteria of the model closely enough that all of those data sets may be deemed to satisfy the criteria, multiple data sets may be generated. Though, multiple data sets may be generated in other ways. In some instances, multiple tasks may be identified based on a user's context.

In some embodiments, a task may be completed differently depending on a goal that is identified for completing that task. If multiple tasks are identified as relevant, multiple data sets associated with multiple goals may be generated by using a different set of criteria for each goal for completing a task.

The system may select appropriate sets of criteria to apply in any suitable way. In some embodiments, an information presentation system may maintain information associated with users that define, for each user, the context of the user. Any suitable information in the user context, such as user's prior searches, purchases, stored data, visited locations and other, may be used to identify one or more tasks and associated goal(s) to generate data sets that are relevant to the search query. For example, in response a search query relating to a digital camera, information on different digital cameras may be presented to the user. In this example, the system may identify as relevant or more tasks related to the presented items, such as "Compare," "Find similar," "Complete" and others. If the user selects an item from the presented items and selects the task "Find Similar," to complete the task, a data set containing information on multiple similar digital cameras similar to the selected item may be retrieved. The "Compare" task may be associated with criteria that, when applied to information in the data sources, generate one or more data sets containing data showing a comparison between items identified based on the user's context when those criteria are applied Likewise, the "Find Similar" task may be associated with criteria that, when applied to information in the data sources, generate one or more data sets containing items similar to one or more items of interest selected by the user. Any suitable measure of similarity may be utilized, including similarity as to a type, price, manufacturer of the items and any other suitable measure of similarity. The "Complete" task may be associated with criteria that generate data sets comprising items related to the selected item so that the user can finalize a selection of items (e.g., for a purchase).

An information presentation system that generates multiple data sets may incorporate a user interface that allows a user to view information in the data sets generated based on the user's context. The user interface may support functions that allow the user to navigate through the data sets, viewing all or portions of a data set at a time or viewing combinations of items selected from different data sets. For example, the user interface may identify tasks that have been identified as relevant. The user may select a task through the user interface. In response, the user interface may display data from one or more data sets generated by applying criteria associated with the selected task.

Along with the presented tasks, associated goals may be presented. The goals may be inferred from the user context. Different data sets may therefore be presented to the user based on a selected goal. For example, if a goal is selected as "Professional," information on similar digital cameras that a professional photographer would use may be presented. However, if the goal is defined as a "Beginner," information on less sophisticated, easy to use cameras may be presented to the user.

As another example, if a user selects a task such as "Ensemble" or "Complete," data sets comprising information on different accessories related to an item of interest may be displayed to complete the task. For example, if the item of interest is a digital camera, data about tripods, camera cases, photographic media, instructional books and many others may be displayed. The data sets may be presented to a user in any suitable format (e.g., textual, graphical, image or a combination thereof) that allows associating the presented information with the items of interest to the user and receive user input with respect to the data sets.

FIG. 1 is a high-level diagram illustrating a computing environment 100 in which some embodiments of the invention may be implemented. Computing environment 100 includes a user 102 interacting with a computing device 105. Computing device 105 may be any suitable computing device, such as a desktop computer, a laptop computer, a mobile phone, or a PDA. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system.

In the example of FIG. 1, server 106 performs functions of a search engine, allowing user 102 to retrieve information relevant to a search query. The user may specify the query explicitly, such as by inputting query terms into computing device 105 in any suitable way, such as via a keyboard, key pad, mouse, or voice input. Additionally and/or alternatively, the user may provide an implicit query. For example, computing device 105 may be equipped with (or connected via a wired or wireless connection to) a digital camera 110. An image, such as of an object, a scene, or a barcode scan taken from digital camera 110, may serve as an implicit query.

Regardless of the type of input provided by user 102 that triggers generation of a query, computing device 105 may send the query to server 106 to obtain information relevant to the query. Server 106 may store or be otherwise associated with different types of information about any suitable objects of interest. For example, server 106 may comprise information on digital cameras and associated accessories on the market. Though, server 106 may comprise information on any suitable item, service, topic, place and any other entities of interest.

A search query is an example of an input that may trigger server 106 to generate one or more data sets that may be relevant in the user's context. Though, any suitable triggering event may be used. Regardless of the form of the trigger, server 106 may respond by applying one or more sets of criteria to data stores accessible to server 106. The data stores may contain information indentified in response to a user search query, though the invention is not so limited. In the illustrated embodiment, each set of criteria is stored as a declarative model. Server 106 may apply identified declarative models to the data to generate data sets to be returned to user 102. The information generated by server 106 may be sent over computer network(s) 108 and be displayed on display 104 of computing device 105. Display 104 may be any suitable display, including an LCD or CRT display, and may be either internal or external to computing device 105. Computing device 105 may receive any suitable input from user 102 with respect to the information presented on display 104.

Figure 2:
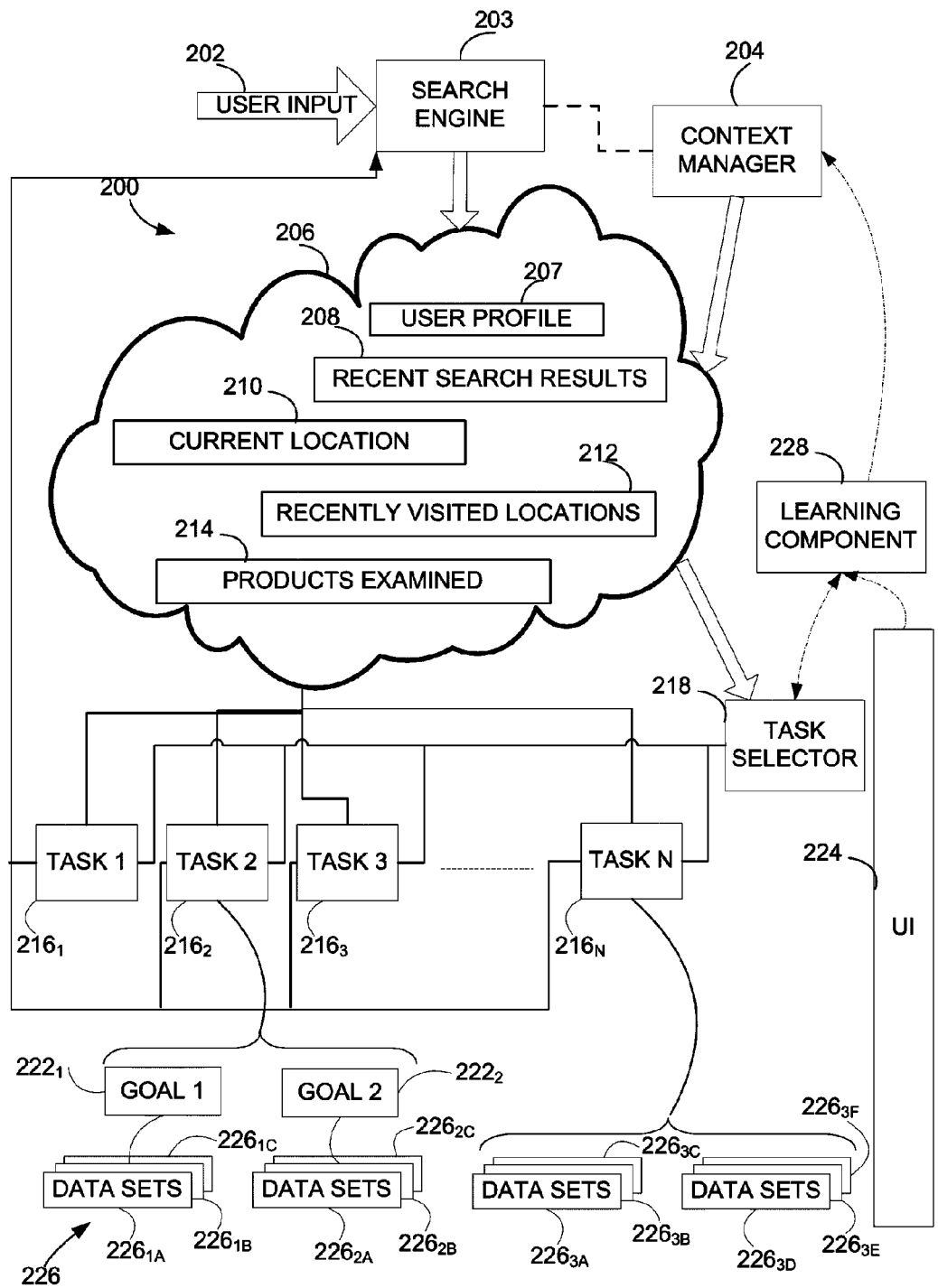
FIG. 2 is an conceptual block diagram of a search stack according to some embodiments.

FIG. 2 is an architectural diagram providing a general overview of components of an information retrieval and presentation system 200, according to some embodiments. In some embodiments, the components illustrated in FIG. 2 may be implemented by server 106 of FIG. 1. Though, some of the components of system 200 may be implemented in computing device 105 (FIG. 1). In addition, certain computations may be apportioned in any suitable manner between server 106 and computing device 105.

Regardless of the specific configuration and implementation of system 200, a user input 202 may be provided as input to system 200 from a portable electronic device operated by a user over a computer networking communications medium, and may be either implicit or explicit, as discussed in connection with FIG. 1. For example, user input 202 may comprise text, an image, a barcode of a product or any other suitable input. The user input 200 may be transformed into a search query of any suitable format, that may be processed by a search engine to generate a body of data to which sets of criteria may be applied. Though, it is not a requirement that the input be the form of a query.

In this example, user input 202 may be provided to search engine 203 to add to a body of data that may be of interest to the user. In the information retrieval and presentation system according to some embodiments of the invention, search engine 203 may be implemented, partially or completely, as any suitable search engine, such as, for example, the BING® search engine developed by MICROSOFT® Corporation. In the information retrieval and presentation system 200, data generated by a search engine is one example of context information 206 that may be generated and stored for a user. More generally, context information 206 may contain any information that is useful in identifying tasks or goals that may be relevant to a user in the user's context. Additionally, context information may contain any information useful in generating data sets based on an identified task or goal. FIG. 2 shows context manager 204 having access to sources of information, such as the output of search engine 203, such that context manager 204 may acquire and store context information for a user.

Context information 206 may be stored in any suitable location with any suitable organization. In the example of FIG. 2, context information is illustrated as a "cloud," indicating that context information 206 may be stored in any one or more suitable locations with any suitable organization. Context information 206, for example, may be stored in computer memory associated with server 106 or with computing device 105 or in any other suitable computer memory. Also, though not expressly illustrated in FIG. 2, information retrieval and presentation system 200 may respond to requests for information from multiple users. Accordingly, context information 206 may be maintained separately for each user or group of users.

User context 206 comprises information that may be acquired explicitly, when the user selects an item from items displayed on a user interface for the item to be added to user context 206. Also, user context 206 may comprise information that is acquired by gathering the user's context though examination of information that the user has recently or currently explored on the user interface and information on the environment around the user that may be collected by suitable sensors. The sensors may sense environmental conditions in the vicinity of the user and, in some embodiments, may be linked to computing device 105. Though, other types of sensors are possible. For example, sensors may identify computer applications accessed by a user or may access sources of data, such as a user calendar, to generate information that may be stored by context manager 204 as a portion of the user's context information 206.

As shown in FIG. 2, user context 206 may comprise such information as user profile 207, recent search results 208, current location 210, recently visited locations 212 and products examined 214. Though, it should be appreciated that user context 206 may comprise any other suitable information. For example, depending on an application, information on "friends" of the user (e.g., other users with whom the user may communicate and share data), products purchased by the user and/or the user's "friends," and any other information relating to the user context may be stored.

A portable electronic device that employs the information retrieval and presentation system in accordance with some embodiments of the invention, such as computing device 105, may be equipped with various sensors which facilitate acquisition of information on user activities and environment around the user. For example, computing device 105 may be equipped with a location sensor (e.g., a GPS) that tracks a location of computing device 105. Accordingly, information on current location 210 and recently visited locations 212 may thus be acquired. It should be appreciated that computing device 105 may comprise any other suitable sensors. Further, in some embodiments, in addition to tracking the location of computing device 105 via suitable sensors, the user may be able to manually input information on current location 210 and/or recently visited locations 212. Furthermore, computing device 105 may be equipped with one or more of such sensors as a microphone, compass, motion detector, accelerometer and any others.

As another example of a sensor, computing device 105 may be equipped with digital camera 110, as shown in FIG. 2. Digital camera 110 may be used to examine products. For example, an image of a barcode of a product may be acquired using digital camera 110 and additional information may be received on the product by using the barcode as a search query. Though, information on products examined 214 may be obtained in any suitable way. For example, the user may perform a search related to a product in accordance with some embodiments of the invention and this information may be stored as part of user context 206.

Recent search results 208 may be data obtained by search engine 203 in response to using user input 202 as search query. Search engine 203 may obtain recent search results 208 in any suitable manner and by accessing any suitable body of data. The body of data may comprise any suitable types of data that may be stored in one or more of suitable storage media, including internally, locally, networked attached media or any combination thereof. It should be appreciated that embodiments of the invention are not limited to a particular way of acquiring and storing information as part of user context 206.

In FIG. 2, user context 206 comprises user profile 207 which may contain information that characterizes the user based on a profession, hobby, preferences, one or more activities in which the user is currently engaged, has been engaged or to be engaged or any other suitable information. For example, user profile 207 may characterize a user as a sports photographer, an amateur photographer, a golfer, a tourist, or a bird watcher. Though, it should be appreciated that user profile 207 may characterize the user in any suitable way.

Regardless of a particular manner in which user context information 206 is acquired, it may be stored in a suitable storage, in a way that indicates the association of the information with the user. In some embodiments, user context 206 may be located on computing device 105, server 106, apportioned in a suitable manner between computing device 105 and server 106 or stored in any other suitable location.

Regardless of the location where context information 206 is stored, context manager 204 may store information as it is generated or access the information as used. Additionally, context manager 204 may perform functions related to maintaining context information 206. Functions performed by context manager 204 may include deleting information that is out of date or deriving values useful as context information from sensor outputs or other data sources. Derived values may include, for example, averages or trends.

Regardless of how context information 206 is stored, it may be used by information retrieval and presentation system 200 to identify one or more tasks that may be relevant to the user given the user's context and to generate data sets for completing identified tasks. In the embodiment illustrated in FIG. 2, data sets are generated based on applying a set of criteria associated with an identified task. The criteria may be applied to context information 206. Context information may include, for example, results generated by search engine 203. Though, data sets may be generated from any suitable sources of information.

In the embodiment illustrated in FIG. 2, a set of criteria associated with each task may be stored as a task model that is part of a pool of task models. FIG. 2 illustrates a pool of task models containing task models $216_1, 216_2 \ldots 216_N$. In operation, based on user input 202 or any other suitable trigger, task selector 218 determines, based on context information 206, relevant ones of the task models $216_1, 216_2 \ldots 216_N$. Task selector 218 comprises a suitable component that both selects and applies task models. In some embodiments, task selector 218 may comprise more than one component, where one or more components may perform the task selection and one or more separate components may apply the selected task(s).

In some scenarios, a task may be completed according to one of two or more goals. Goals associated with a task may be reflected in any suitable way. In the embodiment illustrated in FIG. 2, separate models may be provided for generating data sets to complete a task in accordance with each of multiple goals. In the example illustrated in FIG. 2, task $216_2$ may be completed according to one of two goals, designated as goal 1 and goal 2. Generation of data to complete a task in accordance with each goal may be represented by a separate model, here illustrated as models $222_1$ and $222_2$ for completing task 2 according to goal 1 and goal 2, respectively. Accordingly, when task selector 218 selects relevant task models, it may select from among the entire pool including task models associated with specific goals, such as task models $222_1$ and $222_2$.

Regardless of the task model selected, the selected task models may be applied to information in a data store to generate data sets that are consistent with a set of criteria associated with one of the selected task models. In the example illustrated in FIG. 2, task selector 218 has identified task 2 and task N as relevant in the user's context. As shown, task 2 has goals associated with it such that selection of task 2 may also entail selection of one or more of the goals, if relevant based on user context information 206. In this example, goal 1 and goal 2 associated with task 2 have been selected as relevant. Application of the task model $222_1$ associated with goal 1 results in generation of one or more data sets. In this example, data sets $226_{1A}, 226_{1B}$ and $226_{1C}$ are generated by application of task model $222_1$. Similarly, task model $222_2$ associated with goal 2 may be applied to generate data sets $226_{2A}, 226_{2B}$ and $226_{2C}$. In a similar fashion, task model $216_N$ associated with task N has also been identified by task selector 218. Application of task model $216_N$ may also generate one or more data sets. In this example, six data sets $226_{3A}, 226_{3B}, 226_{3C} \ldots 226_{3F}$ are generated.

In addition to containing a set of criteria that specifies a data set, a task model may contain information identifying actions to be performed with one or more criteria are satisfied. Those actions may include searching for further information. Accordingly, FIG. 2 illustrates that task selector 218 may be coupled to search engine 203. In this way, task selector 218, upon application of a task model may initiate an action that obtains data that may ultimately be included in a data set 226. In this example, such an action may include providing a search query to search engine 203. However, an action specified in a task model may be in any form that may be executed by task selector 218.

The data sets generated as a result of selection and application of one or more task models may be provided through user interface 224 to a user. User interface 224 may be located in computing device 105 or may be distributed across system 200 in any suitable way. In some embodiments, multiple data sets generated as a result of selection and application of one or more task models may be passed to user interface 224 along with a designation of a task and/or goal associated with the task model used to generate each data set. User interface 224 may manage interactions with a user to present data from one or more of the data sets. Based on user inputs, the user interface may present at different times data from different data sets or combinations of data sets. User interface 224 may provide a mechanism through which the user may navigate through the data sets to explore the data generated by system 200. In some embodiments, multiple data sets generated by selection and application of task models may be passed to user interface 224 in anticipation of a user providing input to request data from one or more of the data sets. Though, in other embodiments, user interface 224 may interact with task selector 218 such that user input may impact the selection and application of tasks to generate further data sets.

In embodiments in which a user accesses system 200 through a portable electronic device connected to a server over a network that may include one or more wireless links of limited bandwidth or high latency, improved responsiveness may be obtained if multiple data sets generated by selection and application of multiple task models are transmitted to user interface 224 before a user requests information from those data sets. When information requested by a user can be rendered from a cache maintained by user interface 224, delays associated with sending a request to the server and waiting for a response may be eliminated, making real time interaction through a portable electronic device possible even though the portable electronic device is connected to a data source through a low bandwidth or high latency connection.

Regardless of when data sets are transferred to user interface 224, user interface 224 may provide one or more mechanisms by which a user may identify data sets from which data is displayed. For example, user interface 224 may present to a user information on tasks or goals identified by task selector 218 as relevant to the user based on user context information 206. The user may then specify a task and/or a goal about which the user wishes to receive information. In response to such input, user interface 224 may render a display based on a data set generated by applying a task model associated with the task and/or goal identified by the user. Information about a task and/or a goal may be input by a user in any suitable way and may be input based on one or more interactions between the user and user interface 224. As a specific example, user interface 224 may first present the user with an option to select a task deemed relevant in the user's current context. After making such a selection, the user may then be offered the option to select a goal for the selected task.

User interface 224 may further provide mechanisms through which a user may navigate through data sets. As a specific example, in a scenario in which multiple data sets are generated for a task and goal, user interface 224 may accept user inputs to select or change the data set used to render a display for the user. In response to such user inputs, user interface 224 may select different data sets or may combine elements from multiple data sets.

Each data set of data sets 226 may contain multiple items that are related in that the multiple items are collectively selected to satisfy the selected model and enable the user to complete the task associated with the model. Data sets 226 may be presented to the user in a way that allows the user to navigate through the data sets, displaying only a portion of the possible data sets at one time. In some embodiments, the user may navigate through data sets 226 in different ways. For example, the user may provide input to select different tasks and/or input to select different goals of achieving the task. Furthermore, the user may navigate through data sets 226 by selecting different data of data sets 226 to be presented on user interface 224. Moreover, the user may be presented with different options with respect to presentation of data sets 226 to the user.

Task selector 218 may identify a task model in any suitable way. In some embodiments, task selector 218 may contain an index or other suitable data structure that relates specific patterns of context information with specific tasks. In such a scenario, task selector 218 may identify a task model as relevant in a user context by detecting within user context information 206 a specific data pattern correlated to a task model. Information correlating a data pattern to a task model may be developed in any suitable way. Such correlation information may be provided by an entity generating the task models. Though, in other embodiments, correlations between data patterns and task models may be generated in an automated or semi-automated fashion. In the embodiment illustrated in FIG. 2, system 200 includes learning component 228 to create or update associations between data patterns within user context information 206 and specific one of the available task models. Learning component 228 may operate according to machine learning principles as known in the art. Application of such machine learning techniques may alter the correlations between data patterns and specific task models based on user feedback. As a specific example, task selector 218 may identify a specific task model as relevant to a user based on the user's context and then generate a data set based on that identified task model. If, upon displaying that data set to the user, the user provides input indicating that the data is not relevant in the user's context, the correlation information maintained within task selector 218 that was used to identify the specific task model may be updated to reduce the likelihood that the same task model will be selected in similar scenarios. Such user input may be expressly provided, such as in response to a prompt asking the user if the generated information was helpful, or may be implied from user action. For example, if a user quickly deletes or spends little time viewing data generated by a task model, learning component 228 may infer that the task model is not useful in the user's context and update the selection information maintained by task selector 218 accordingly.

Figure 3:
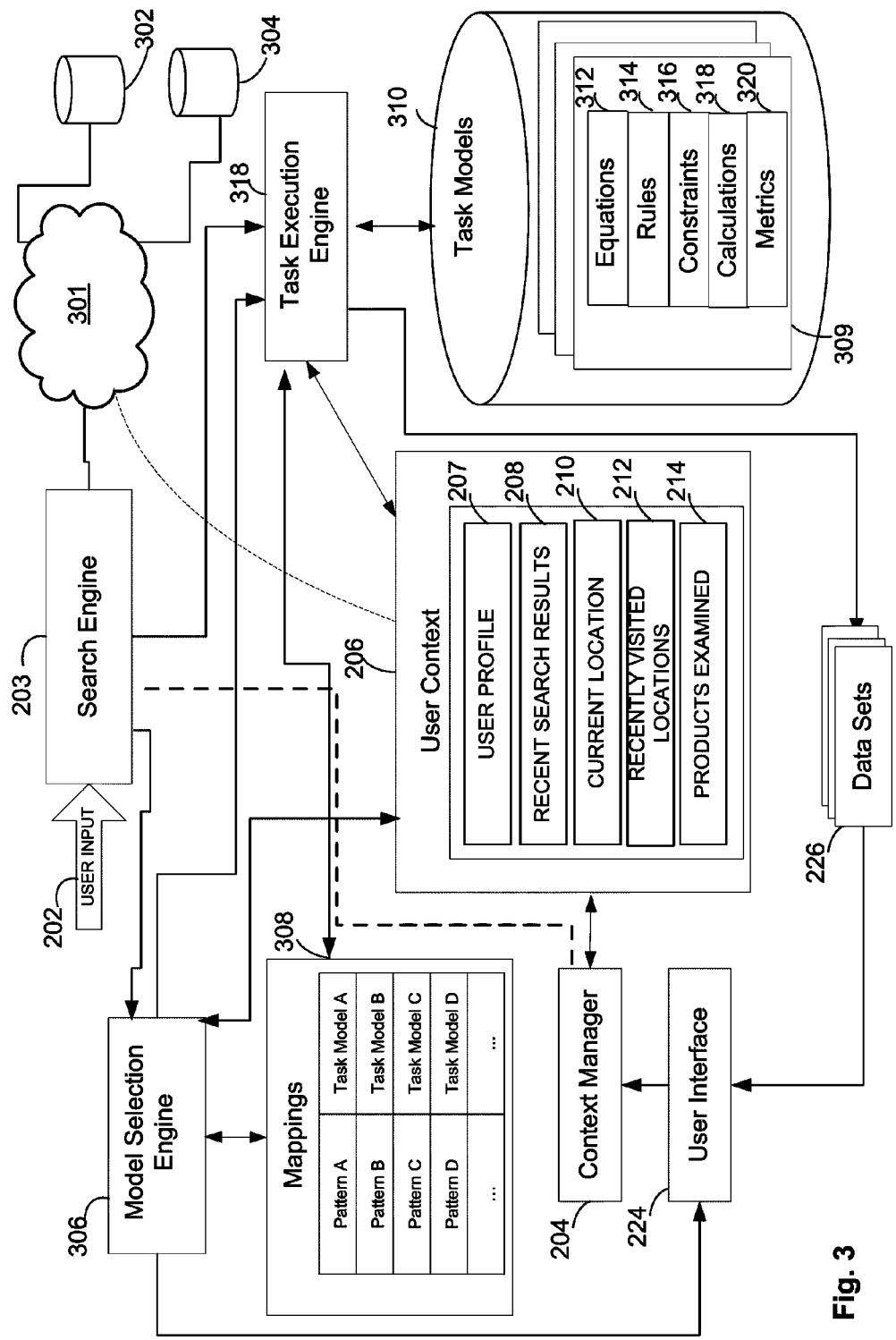
FIG. 3 is an architectural block diagram of the search stack according to some embodiments.

FIG. 3 is another architectural block diagram illustrating components of system 200 in more details. The components illustrated may be located on computing device 105, server 106, apportioned in any suitable way between computing device 105 and server 106, or may be located on any other suitable entity.

In FIG. 3, similarly to FIG. 2, user input 202 may be provided to search engine 203, which is coupled to context manager 204. In some embodiments, search engine 203 may be stored on or otherwise associated with server 106.

Search engine 203 may retrieve data using conventional techniques or in any other suitable way. Search engine 203 may retrieve the data from any suitable location. In the example illustrated, to demonstrate that search engine 203 may access any suitable different bodies of data to retrieve the data as the search results, search engine 203 is shown as coupled, via a network 301, to a data source 302 and a data source 304. The network 301 may be any suitable network and may comprise a local area network or a wide area network, such as an enterprise network or the Internet. Such networks may be based on any suitable technology and may operate according to any suitable protocol, and may include wireless networks, wired networks or fiber optic networks. Data sources 302 and 304 may be any suitable collections of data.

The system of FIG. 3 may also include user context information 206. User context information 206 may include results of searches performed by search engine 203 or any other suitable information that may indicate a user context, including the types of information described above in connection with FIG. 2.

Also as in FIG. 2, context manager 204 may add, delete and organize information stored within user context information 206. Likewise, a user interface 224 may be included to present data sets 226 generated by the system.

In the example of FIG. 3, additional details of task selector 218 (FIG. 2) are illustrated. In the example of FIG. 3, the functions associated with task selector 218 are shown to be performed by model selection engine 306, mappings 308 and task execution engine 318. These components interact to select and apply one or more task models from pool 310 of task models to generate data sets 226 that may be made available to a user.

Accordingly, in FIG. 3, model selection engine 306 is shown as coupled with mappings 308, which include mappings between one or more patterns and task models. In the example illustrated, mappings 308 comprise patterns A, B, C and D associated with task models A, B, C and D, respectively. It should be appreciated that mapping 308 may comprise any suitable number of mappings between the patterns and the task models. Though four mappings are illustrated, it should be appreciated that mappings 308 may contain numerous mappings between data patterns that may exist in user context information 206 and specific ones of the models in pool 310. Mappings 308 may be implemented on any suitable storage media and may be in any suitable format.

Model selection engine 306 may access mapping 308 and user context information 206 to identify one or more task models that may be relevant in the user context by matching the patterns associated with one or more of the models to the user context information 206. Each identified task model may be indicated to task execution engine 318. Task execution engine 318 may access the identified task model from pool 310 and apply the task model to generate one or more data sets 226. In scenarios in which multiple task models are identified by model selection engine 306, task execution engine 318 may generate data sets 226 by application of all identified models.

In scenarios in which multiple models are used to generate data sets 226, all of the data sets may then be stored on computing device 105. Accordingly, when data sets 226 are presented on a user interface, such as user interface 224, user may explore the data sets, which may include instructing different portions of data sets 226 be presented on the user interface, without having to access server 106 or any other component other than a location in computing device 105 storing the data sets. This may allow providing requested information to the user with a small delay, which improves the user experience. Moreover, storing data sets 226 which comprise only a fraction of a large body of available data may be advantageous when a portable electronic device (e.g., computing device 105) includes a limited amount of memory, which is often the case. Accordingly, storing on computing device 105 multiple data sets 226 that are relevant to user input 202 may lead to improving user experience because the user is provided promptly with the information that is, being generated based on user context 206, is of interest to the user, matches well user's expectations and may provide suggestions to the user which are broader that the original user's query.

The models identified using mappings 308 may be obtained from a model storage component such as task models 310 storing multiple models, each of which is referred to by way of example only as model 309. It should be appreciated that different task models 310 may store different models.

Each task model 309 (which may be constructed as a series of declarative statements) may comprise equations 312, rules 314, constraints 316, and calculations 318. Each of these elements of a task model may be encoded in a form so that it may be applied by task execution engine 318 to user context information 206. To identify data to be included in data sets 226 or to identify any other suitable action. In some embodiments, the task model may be stored in a file, and may be treated as a web page. Though, task model 309 may be stored in any suitable way as embodiments of the invention are not limited in this respect.

Task model 309 may comprise one or more elements, which may be statements in a declarative language. In some embodiments, the declarative language may be at a level that a human being who is not a computer programmer could understand and author. For example, it may contain statements of equations 312 and the form of a result based on evaluation of an equation from equations 312. An equation may be a symbolic or mathematical computation over a set of input data.

Task model 309 may also comprise statement(s) of one or more rules 314, where each rule may be associated with the form of a rule result based on evaluation of an equation. The application of some types of rules may trigger a search to be performed, thereby collecting new information. According to some embodiments, when a model such as task model 309 containing a rule, is applied, such as by task execution engine 318, the evaluation of the rule performed as part of the application of the model may generate a search query and trigger a search to be performed by the data search engine, such as search engine 203. Thus, in such embodiments, an Internet search may be triggered based on a search query generated by the application of a model. Though, a rule may specify any suitable result. For example, a rule may be a conditional statement and a result that applies, depending on whether the condition evaluated dynamically is true or false. Accordingly, the result portion of a rule may specify actions to be conditionally performed or information to be returned or any other type of information.

Task model 309 may also comprise statement(s) of one or more constraints, such as constraints 316. A constraint may define a restriction that is applied to one or more values produced on application of the model. An example of a constraint may be an inequality statement such as an indication that the result of applying a model is to generate data sets containing a value for a parameter that is greater than a defined value.

Task model 309 may also include statements of one or more calculations 318 to be performed over input data. Each calculation may also have an associated result, which may be included in the data sets 226 or otherwise used in selecting data for the data sets. In some embodiments, the result may label the result of the specified calculation such that it may be referenced in other statements within model 309 or otherwise specifying how the result of the computation may be further applied in generating information to a user. One or more of calculations 318 may be an expression representing a numerical calculation with a numerical value as a result, or any other suitable type of calculation, such as symbolic calculations. In applying model 309 to suitable data, such as user context 206, task execution engine 318 may perform any calculations over the data that are specified in the model specification, including attempting to solve equations, inequalities and constraints over the data.

Task model 309 may also include statements of one or more metrics 320, which can be used to provide a measure of how well a task associated with model 309 is completed. The metrics 320, for example, may be expressions that operate over the data attributes of each returned collection of items, returned when the task model is executed and may produce a merit score of how well in fact each collection completes the task. Examples of metrics 320 may include "a percentage difference from target price of an ensemble," "a number of miles from a desired location of a restaurant," "a number of constraints denoted as critical in the model that were satisfied," or any other suitable ways of assessment of a quality of completing the task. In some embodiments, it may be desirable to limit the amount of data communicated to user interface 224. In such a scenario, metrics 320 may be used to rank the data sets generated by application of a task model such that data sets 226 include a limited number of data sets for each task model, with the included data sets being selected based on application of metrics 320.

In some embodiments, the statements representing equations, rules, constraints, calculations or metrics within a model may be interrelated, such that information generated as a result of one statement may be referenced in another statement within task model 309. In such a scenario, applying task model 309 may entail determining an order in which the statements are evaluated such that all statements may be consistently applied. In some embodiments, applying a model may entail multiple iterations during which only those statements for which values of all parameters in the statement are available are applied. As application of some statements generates values used to apply other statements, those other statements may be evaluated in successive iterations. If application of a statement in an iteration changes the value of a parameter used in applying another statement, the other statement will again be applied based on the changed values of the parameters on which it relies. Application of the statements in a model may continue iteratively in this fashion until a consistent result of applying all statements in the model occurs from one iteration to the next, achieving a stable and consistent result. Though, it should be recognized that any suitable technique may be used to apply a task model 309.

The pool of task models stored on computer-readable media associated with server 106 (FIG. 1) may be generated in any suitable way. In some embodiments, the task models may be supplied by an entity operating the search system, such as search stack 200. Though, in other embodiments, all or a portion of the task models may be provided by parties other than the entity operating the search system. In some embodiments, task models may be supplied by third parties. Such third parties may include businesses or organizations that have a specialized desire or ability to specify the nature of information to be generated in response to a search query. For example, task models that generate data sets relevant to a purchase of a TV may be provided by electronics dealers. Accordingly, when the user searches for a TV, task models from the electronics dealers may generate data sets providing information on other products, relating to a TV, that in a suitable combination, may be used, for example, to assemble a home theater system.

As another example, task models that generate data sets relevant to a search for a book may be provided by booksellers. Similarly, entities having expertise in any other suitable products and services may provide the task models to be used for generating the data sets. Accordingly, it should be appreciated that any number or type of task models provided by different entities may be included in pool 310.

In FIG. 3, it is shown that application of the task models to user context information 206 results in generation of data sets 226. One or more of data sets 226 may be displayed on a suitable graphical user interface, such as user interface 224, of the type that allows a computing device to detect user input relating to the one of more of the displayed data sets. In some embodiments, the user input may be provided requesting a variation in the displayed data. Thus, in response to the user input with respect to the displayed data, alternative data sets from data sets 226 may be displayed.

A portable electronic device, such as computing device 105, employing the search system in accordance with some embodiments, may receive the user input provided in any suitable manner. For example, the user input may comprise a swiping motion across a display comprising user interface 320. Further, receiving the user input may comprise detecting a shaking motion of the portable electronic device. Any other user input may be received as well, including conventional ways of selecting displayed data.

FIG. 3 also illustrates one of the ways in which user context information 206 may be generated or updated. As shown in FIG. 3, user interface 224 may be coupled with context manager 204 that maintains user context 206. Accordingly, information on the user input received with respect to portion(s) of data sets 226 presented on user interface 224 may be stored as part of user context information 206. For example, user preferences may be identified from the user's choices and then stored in user profile 207. If the user purchases and/or examines certain products, related information may also be recorded in user profile 207 or as products examined 214. Though, information based on user input or actions may be stored in user context 206 in any suitable manner and format as embodiments of the invention are not limited in this respect.

Figure 4:
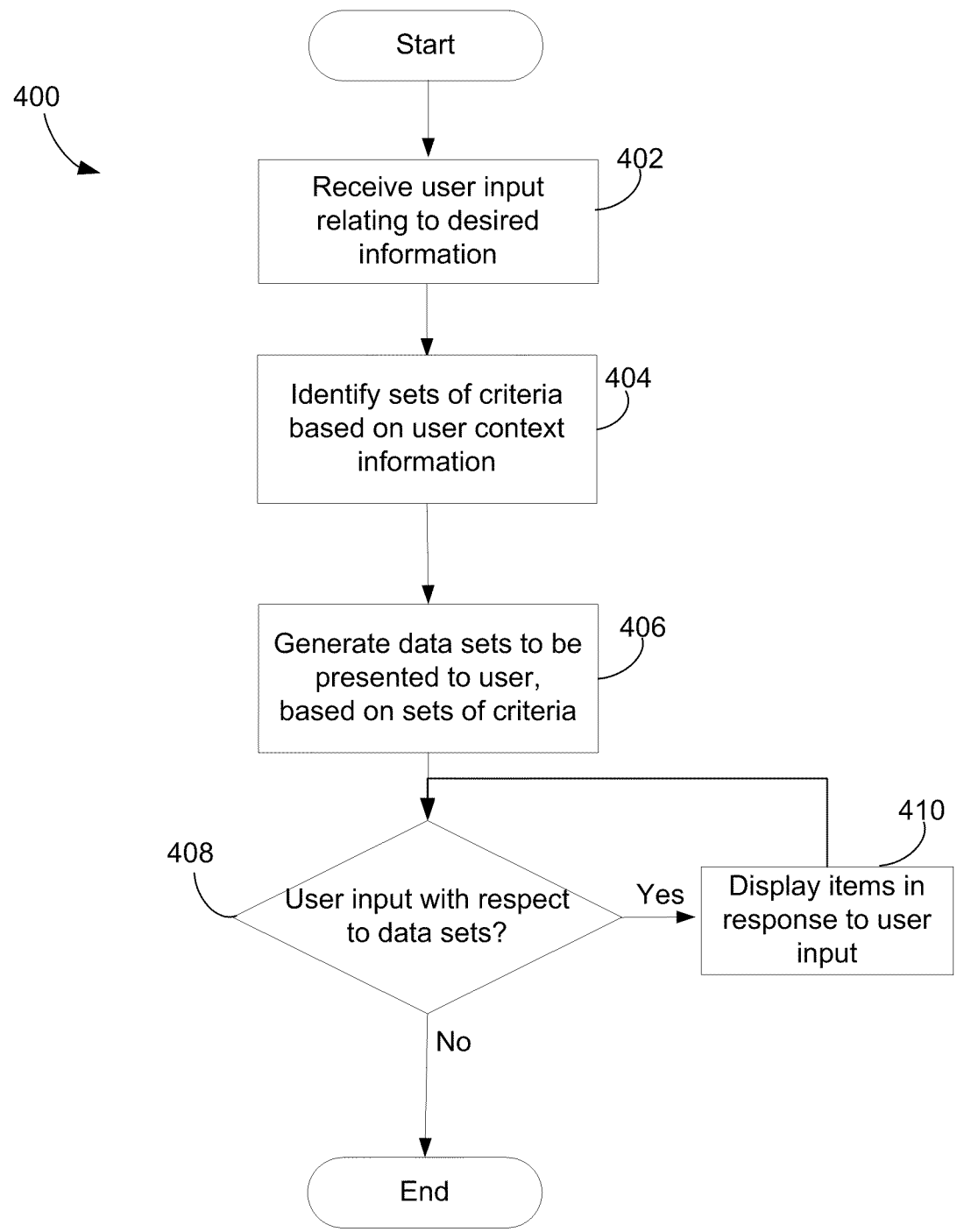
FIG. 4 is a flowchart of a process of generating data sets in response to a user input, in accordance with some embodiments of the invention.

FIG. 4 illustrates a process of generating data sets in accordance with some embodiments of the invention. The process of FIG. 4 may be controlled by one or more processors that are part of information retrievable and presentation system 200 (FIG. 2). Though, the process may be performed under the control of any suitable control circuitry, which may be configured to execute the process by computer-executable instructions stored in a computer-readable storage medium or in any other suitable way. Process 400 may start at any suitable time. For example, process 400 may start when a user operates a portable electronic device (e.g., computing device 105) and provides a user input relating to a search for an item, information, service or any other suitable search. Thus, at block 402, a search engine, such as search engine 203 (FIG. 2), may receive user input comprising a request for information. The user input may be received in any suitable form and may be explicit input, such as an input of a text or an input provided with respect to an item displayed on a graphical user interface. In some embodiments, the user input may be implicit—for example, the user may scan a barcode of a product in a store, take a picture of an item or provide any other suitable action that may be interpreted as an indication that the user desires to receive information.

Regardless of how the user input is received, it may become a part of user context information that may reveal one or more tasks for which a user would like to receive information. At block 404, sets of criteria may be identified based on the user context information. Each set of criteria may be expressed as a model that characterizes information to be provided to the user. The model may be selected from a pool of models based on user context information. The sets of criteria may be identified as a model in any suitable way. In some embodiments, information in the user context information 206 (FIGS. 2 and 3) such as user profile 207, recent search results 208, current location 210, recently visited locations 212 and products examined 214 may be used to identify the criteria.

Next, at block 406, data sets, such as data sets 226, may be generated based on the identified sets of criteria. Items within a data set of the generated data sets may be related in a sense that they allow the user to perform, or complete, one or more tasks that are relevant to the user's context as represented by context information 206. Accordingly, in some embodiments, each data set comprises information about an ensemble of items that are useful in completing a task. Further, as discussed above, tasks may be completed differently depending on a goal. Accordingly, the identified sets of criteria, and therefore the generated data sets, may relate to task and goals.

While many or all of the selected data sets may be relevant to the user, it may not be practical or useful to present to the user all of the generated data sets. Accordingly, one or more of the generated data sets that complete a task may be presented to the user, such as by display on a graphical user interfaces. Because a task may be completed differently depending on a goal or each task may generate multiple data sets, or because multiple tasks may be identified, the user may be presented with controls on the graphical user interface that allow the user to specify portions of the data in the data sets to be displayed.

Regardless of the way in which one or more of the generated data sets 226 are provided to the user, it may further be determined, at decision block 408, whether user input provided with respect to the data sets is detected. The user input may request a variation in the displayed data. The user input may be received in any suitable way. For example, receiving the user input may comprise detecting a swiping motion across the display. In some embodiments, receiving the user input may comprise detecting a shaking motion of the portable electronic device, such as computing device 105. The user input may also be provided in any conventional way, for example, a selection of a suitable control (e.g., a button, a menu field, etc.) on the user interface. In some embodiments, the user input may be provided via any suitable input device, such as a stylus.

If it is determined, at block 408, that user input is provided with respect to data sets 226, different items may be displayed on the graphical user interface, at block 410. For example, when an ensemble of items forming a data set from data sets 226 is displayed on the display, in response to the user input comprising a swiping motion, an alternative data set from data sets 226 containing a different ensemble of items may be displayed on the display. In some scenarios, the alternative data set may be disjoint from the data set displayed prior to detecting the swiping motion. Similarly, when an ensemble of items forming a data set from data sets 226 is displayed on the display and the user input detected at block comprises a shaking motion of computing device 105, an alternative ensemble of items may be selected from multiple ones of the data sets 226. In this scenario, the ensemble may include some of the items that were displayed prior to the user input.

In some embodiments, any suitable information about an item displayed on the display may be presented. For example, if an item comprises a product of interest, such as a digital camera, such information as one or more places to buy the digital camera and prices at which the camera is sold at the places may be displayed. In some embodiments, accessories related to the digital camera, such a tripod, different lenses, an instructional manual, a case and any other suitable items may be displayed. The items may be presented using any suitable textual, image and graphical representation and a combination thereof, in a manner that allows the user that requested the information on the digital camera to receive the information in an easy and intuitive way. Moreover, the requested information may be presented in a manner that enables the user to further explore the information, including displaying alternative portion(s) of the information and presenting the information in different forms. It should be appreciated that embodiments of the invention are not limited to any particular way in which the requested information may be presented on a display. In some embodiments, the user input with respect to retaining one more items displayed on the display may be received. For example, when the display comprise items representing a set of accessories for a digital camera, the user may provide an appropriate input (e.g., a selection of a radio button or any other suitable input) with respect to one or more of the displayed items to "pin down" such items. Hence, when another user input is then provided, the "pinned down" items are retained on the display, whereas the items which were not selected to be retained on the display are replaced by different items which may be items from the same ensemble or a different ensemble. The user input provided after certain items have been "pinned down" may be referred to as "spinning" a current selection of the items on the display and may comprise, for example, a swiping motion across the display, a shaking motion of computing device 105 or any other suitable input. In some scenarios, user input will result in changing the display such that an alternative ensemble of items useful in completing a task and/or goal replaces another ensemble of items useful in completing the same task or goal. Though, it should be recognized that other mechanisms for a user to indicate a desire to receive an alternative ensemble of items may be incorporated. In some embodiments, the user input may comprise a suitable input (e.g., a swiping motion) with respect to "pivoting" an item of focus so that the item is replaced with an alternative item. Upon pivoting, a data set relating to the alternative item of focus may replace a data set relating to the prior item of focus.

As shown in FIG. 4, after one or more items are displayed in response to the user input, at block 410, process 400 may branch back to decision block 408 where it may again be determined whether user input is provided with respect to the displayed items. Accordingly, process 400 may be iterative and the user input may be received multiple times while the user is exploring the information provided in response to the user's request for information. If it is determined, at block 408, that no user input is provided with respect to data sets 226, process 400 may end. Process 400 may end when a user no longer desires to view the data sets generated at block 406 because the user may have finished exploring for information. Alternatively, process 400 may end when the user provides an input indicating a desire to receive information that is not contained within the data sets generated at block 406. In that scenario, following the end of process 400, the process may be repeated based on the user input indicating a desire to receive data that is not included in the previously-generated data sets.

Figure 5:
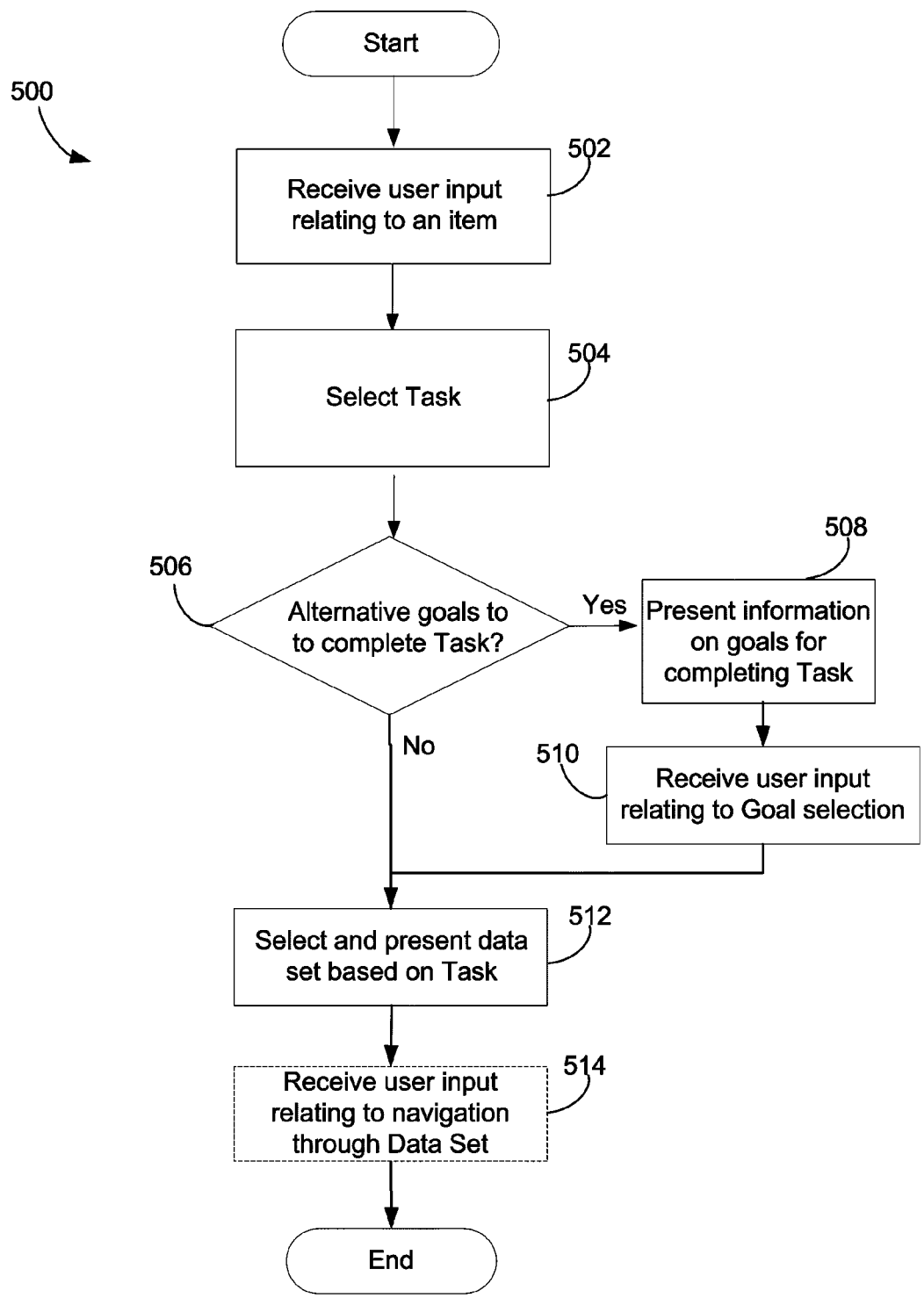
FIG. 5 is a flowchart of a process of navigation through the data sets generated as shown in connection with FIG. 4 and displayed on a graphical user interface, in accordance with some embodiments.

FIG. 5 illustrates another process 500 of generating data sets in response to user input indicating a user's desire to receive information, in accordance with some embodiment of the invention. Process 500 may be implemented in a search stack of the information retrieval and presentation system in accordance with some embodiment of the invention. Though, the process may be performed under the control of any suitable control circuitry configured to perform the functions illustrated in FIG. 5. In FIG. 5, process 500 may start when user input relating to an item of interest is received, at block 502. The user input, such as user input 202 (FIGS. 2 and 3), may be received in any suitable form and via any suitable means. In some embodiments, the user input may be used to formulate a search query for a search engine, such as search engine 203 (FIGS. 2 and 3). The search query may then be used to search for information requested by the user among any suitable body of data. For example, data sources 302 and 304 may be accessed via network 301 by search engine 203, as shown in FIG. 3. Data obtained by search engine 203 in response to the search query may be stored in a suitable storage component, such as user context information 206, as recent search results 208.

As discussed above, data stored in user context information 206 may be used to select, at block 504, one or more tasks about which data is to be presented to the user. The tasks may be selected so that one or more of the data sets related to the user's request for information may be generated such that the data sets complete the task. The task models may facilitate interpretation and processing of search queries generated from the user input. For the sake of simplicity only, a single task is discussed in connection with FIG. 5. However, it should be appreciated that different patterns defined as task models, such as those shown in mappings 308 (FIG. 3), may be identified in user context 206 to generate multiple data sets for completion of multiple tasks. The user may then navigate through the data sets by viewing, at different times, different collections of items each of which completes the selected task.

In some embodiments, the user may be presented with different options with respect to presentation of data sets 226 to the user. Thus, because data sets 226 may complete the task differently, depending on the goal, at decision block 506, it may be determined whether alternative goals to complete the task have been identified. The goals may be identified in any suitable way, including based on information included in a task model. In some instances, user context information 206 may be used to determine different goals, of completing a task based on different information associated with the user. For example, user context 206 includes user profile information, such as user profile 207 that may include user profiles that may identify the user.

As a specified example, a profile may characterize a user based on a profession, hobby, activity engaged in or to be engaged in by the user or in any other suitable way. For example, a user profile may identify a user as a beginner photographer, a sports photographer, a professional photographer, a tourist, a bird watcher, or using any other suitable characteristics. The task may be completed differently depending on the goal—i.e., different ensembles of items that complete the task may be displayed on the display. Accordingly, if a task comprises providing information on digital cameras and related accessories to the user, information on different digital cameras and accessories may be provided to the user when the goal comprises completing the task for a beginner photographer and the goal comprises completing the task for a professional photographer. Indeed, a beginner photographer would look for features in digital cameras that are different from those of interest to a professional photographer. In some embodiments, a goal may be selected for an identified task automatically by the information retrievable and presentation system 200 based on profile information or other information in user context information 206. Though, in some embodiments, a user may be prompted to specify a goal from among the goals associated with a task selected at block 504.

If it has been determined, at block 506, that more than one goal to complete the task has been identified, process 500 may proceed to block 508, where the information on the identified goals may be presented to the user so that the user may select a goal from the identified goals to complete the task in accordance with the selected goal. The alternative goals of completing the task may be displayed on the user interface in any suitable manner that allows associating the goals with the task and receiving user input with respect to selection of a goal of the displayed goals.

Next, at block 510, user input relating to a selection of a goal of the displayed goals that complete the task may be received. The user input may be received in any suitable manner. For example, the user input may comprise touching, depressing or otherwise activating a suitable control of the user interface.

If it has been determined, at block 506, that no alternative goals of completing the task are identified, process 500 may proceed to block 512 where one or more of data sets 226 that complete the task, based on a selected goal if a goal was selected, may be selected and presented to the user. The selected data sets may be displayed to the user on a display (e.g., a display of a computing device 105). Also, if the user input relating to the selection of the goal of the displayed goals has been received, at block 510, process 500 may also continue to block 512 where one or more of data sets 226 that complete the task given the selected goal may be selected and presented to the user.

In some embodiments, the user may navigate through data sets 226 generated in response to user input 202, as shown schematically by block 514 where user input relating to navigation through data sets 226 may be received. The user may navigate through data sets 226 in many different ways. For example, the user may select alternative goals of completing the task. As a result, different ensembles of items that complete the task given a selected goal may be displayed. Furthermore, the user may selected different items in an ensemble as focus of interest, including requesting additional information on the item of interest. Further, the user may provide input instructing the information retrieval and presentation system in accordance with some embodiments of the invention to display the items in data sets 226 in different order, accompanied by additional information (e.g., different characteristics of the items, results of comparison of items, etc.) and in any other suitable variations.

In FIG. 5, process 500 is shown to end after processing at block 514 is performed. Though, it should be appreciated that process 500 may be iterative so that the user may utilize the information retrieval and presentation system for any suitable period of time during which the user may provide user input comprising a request for information and explore results (e.g., data sets 226) generated in response to the request. Exploring of the results may comprise displaying only a portion of the results at a time. Moreover, as discussed above, the user may be presented with different options with respect to presentation of the results to the user. Furthermore, upon viewing (and exploring) the data sets generated in response to the user's request for information, a new request for information may comprise a request for information on a different item of interest.

Figure 6A:
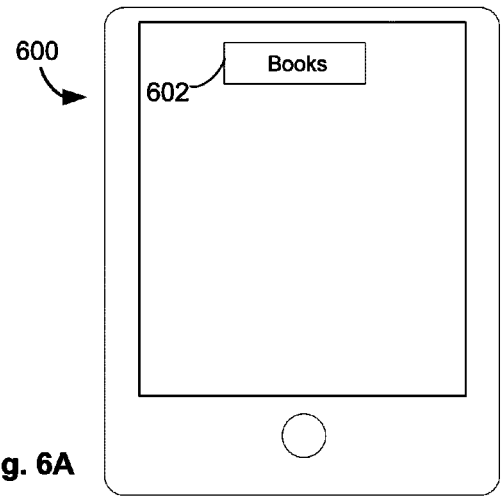
FIGS. 6A, 6B and 6C are exemplary diagrams illustrating a user interface that receives a request for information from the user and displays data sets generated in response to the request for information.
Figure 6B:
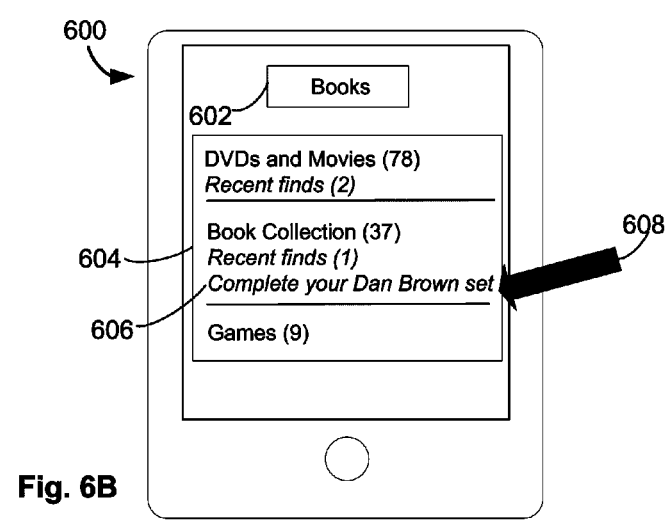
Figure 6C:
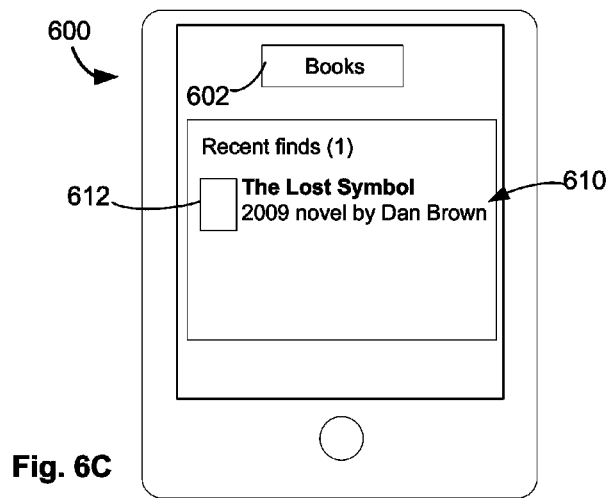

FIGS. 6A, 6B and 6C illustrate an example of a display comprising a graphical user interface 600 that presents different information as a user's request for information is received. The user's request for information may be received through the user interface or via any other suitable means. User interface 600 may be, for example, a user interface of a display of computing device 105.

In FIG. 6A, the user input comprising a request for information on "Books," as indicated in component 602. The request may be received via any suitable means and in any suitable manner. For example, the user may type in the word "book" or "books" in a field of user interface 600. It should be appreciated that the display may comprise any suitable controls, such as a scroll wheel, a rotatable wheel, buttons including one or more touch buttons and any other controls, which are not shown for the simplicity of representation. Also, the user interface may comprise any other suitable information that is not displayed for the sake of simplicity.

In response to receiving the user input comprising the request for information on "Books," an information retrieval and presentation system in accordance with some embodiments of the invention may generate data sets, such as data sets 226, that each may complete one or more tasks relating to the request for information. The data sets may be generated by selecting appropriate task models based on user context information 206 and applying the selected task models.

In this example, user context information 206 may contain information indicating that the user has an interest in books by a particular author, such as Dan Brown. Accordingly, in response to a request for information about books, the information retrieval and presentation system may identify that it contains a task model for completing a set of books by an identified author and generate a data set using this task model with information for completing a set of books by the author Dan Brown. Other items within user context information 206 may indicate other interests of the user that may in turn be used to identify tasks that can generate data sets of interest to the user. For example, user context information 206 may contain information indicating that the user is an avid fan of movies. In response, the information retrieval and presentation system may identify a task model that can be used to generate a data set describing movies relating to books recently viewed by the user. Other information may be used to identify other tasks that may be of interest to the user based on the user's context.

The identified tasks for which the information retrieval and presentation system contains task models that may be used to generate data sets may be displayed on user interface 600, such as information 604 (FIG. 6B).

In the example of FIG. 6B, user interface lists tasks that may be of interest to the user, such as a task for finding DVDs and movies. Each of the tasks may be completed according to one or more goals, which may also be indicated as options for the user. In the example of FIG. 6B, the task of finding DVDs and movies may be completed according to a goal in which only DVDs or movies classified as "recent finds" are identified.

Similarly, the information retrieval and presentation system may be programmed with a task model that enables a user to manage book collections. An option to generate data sets based on a task model that identifies data sets related to the user's book collection. Such a task may be associated with one or more goals. For example, the task may be associated with a goal related to "recent finds" or a goal of "completing your Dan Brown set." Each of these goals may itself be associated with a task model such that, if selected, a data set generated by the task model may be presented to the user.

As a final example, the information retrieval and presentation system may be programmed with a task model that generates data sets related to games that are connected to books identified in the user context information 206.

The number and nature of the tasks and associated goals that may be identified in response to a user indication of interest in information about books is not critical to the invention. The specific number and nature of the tasks and goals identified in response to such a request may depend on the number and nature of task models programmed in the information retrieval and presentation system. However, in this example, three tasks, one associated with DVDs and movies, one associated with book collections, and one associated with games, are indicated displayed within information 604. In this example, the number of items in the data set associated with each of the tasks may also be displayed. For example, the task model that identifies DVDs and movies is shown with a numeral "78" next to it, which may indicate the number of DVDs or movies about which information is contained in the data set generated by the associated task model. Similarly, the numeral "2" indicates the number of recent finds for DVDs and movies. Other numbers may be included for other tasks and goals that the information retrieval and presentation system deems may be relevant to the user in the user's current context.

Each of the tasks and goals about which information may be available based on the user's current context may be displayed as controls. In response to a user selection of such a control, the system may present to the user additional information generated in accordance with a selected task or goal. That information may be rendered based on operation of a portable electronic device providing user interface 600 or interaction between such a device and a server on which portions of the information retrieval and presentation system resides. In embodiments in which data sets generated by application of the task models associated with each of the displayed tasks and goals is transferred to the portable device in conjunction with an identification that such tasks and goals may be relevant to the user in the user's context, the portable electronic device may generate a new display based entirely on cached information. Though, in some embodiments, the portable electronic device, in response to user input indicating a request for information associated with one of the tasks or goals, the portable electronic device may send a communication to a server, such as server 106 (FIG. 1) which may then apply a task model associated with the indicated task or goal to generate data sets, which may then be conveyed to the portable electronic device.

Regardless of when information in the data set to be presented to the user in response to a user selection of a task is transferred to the computing device presenting user interface 600, information in the data set may be used to generate a new display containing additional information based on the data set.

As an example, if a user input is received indicating a selection of the task to "Complete your Dan Brown set" 606, as schematically shown in FIG. 6B by an arrow 608, user interface 600 may display information 610 on a new book by Dan Brown, "The Lost Symbol," as shown in FIG. 6C. Information 610 may comprise any suitable information on the book, such as its title and image 612. This information may be generated by the information retrieval and presentation system in any suitable way. It may, for example, already be stored in user context information 206 based on recently conducted searches. Though, as described above, application of a task model may trigger one or more searches to be performed by a search engine. Accordingly, information 610 may have been obtained by search engine 203 when a task model associated with completing a set of books related to a specific author was applied.

The content of information 610 is not critical to the invention. Moreover, the displayed information may include one or more other controls that allow the user to further navigate available information. In this example, information 610 may contain a control that allows the user to request further information on the book. For example, in embodiments where computing device 105 is connected to the Internet, information 610 may be presented to the user as a link to one or more web pages so that the user may access the web page(s) and receive further information on the book. The user may provide different user input with respect to the new book. For example, information 610 on the new book may be added to a list of books to be purchased by the user or the user may actually purchase the book.

Figure 7A:
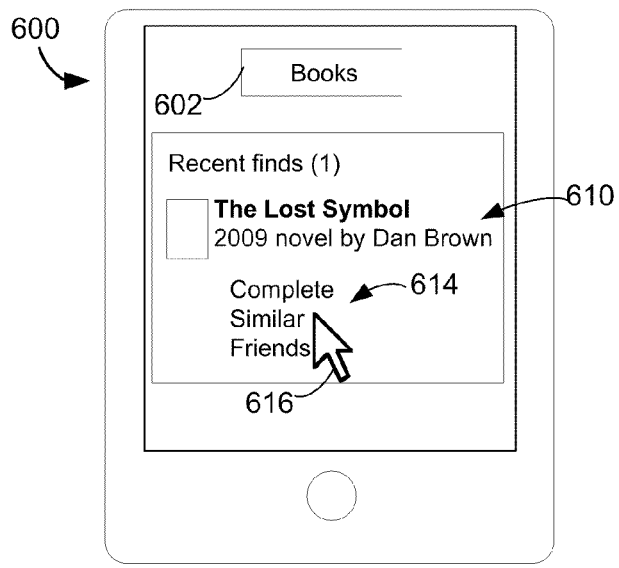
FIGS. 7A, 7B, 7C and 8 are diagrams illustrating examples of navigation by the user through the data sets generated in response to the request for information.
Figure 7B:
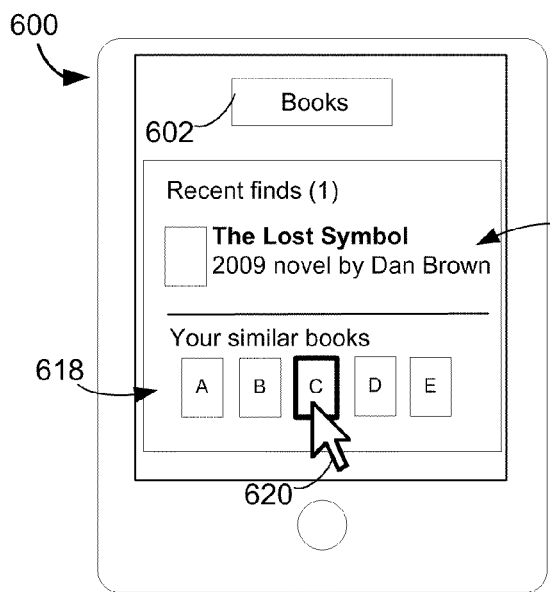
Figure 7C:
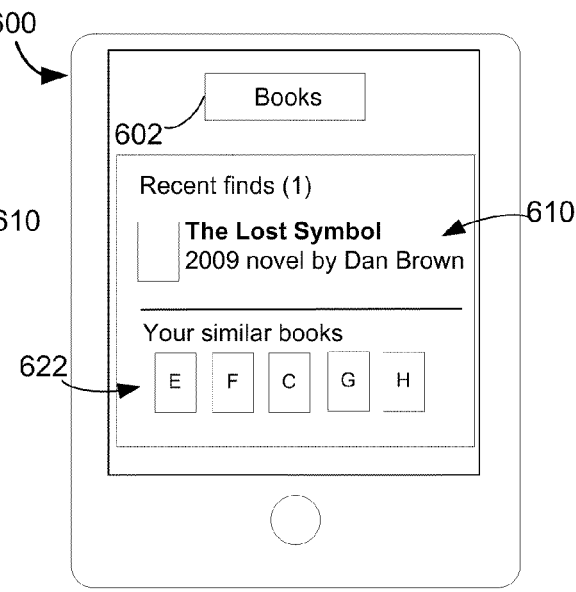

FIGS. 7A, 7B and 7C illustrate further information that may be presented to the user that has provided the request for information on "Books" described above in connection with FIGS. 6A-C and navigated to the point that information on a specific book is presented to the user. In this example, the information 610 displayed to the user through interface 600 may be regarded as a portion of the user context information 206. With information 610, a part of user context information 206, additional tasks may be identified and a user may be presented an option to have information completing these tasks displayed.

As shown in FIG. 7A, tasks 614 have been identified and presented to the user. In this example, tasks 614 comprise "Complete," "Similar" and "Friends." The "Complete" task may be related to presenting to the user a collection of items related to information 610 provided in response to the user's request. "Friends" task may relate to presenting to the user information associated with user's friends related to information 610. The information on the user's friends may be stored, for example, in user context 206. Furthermore, the information on the user's friends may be obtained by the search stack from any other suitable data source.

"Similar" task, as the name implies, may comprise presenting to the user items similar to information 610, where the "similarity" may be determined using any suitable measure of relationship of data available to the search stack to information 610. In the example illustrated, user input, schematically shown by an arrow 616, indicating a selection of the task "Similar" may be received, as shown in FIG. 7A. In response, information 618 on similar books from user context 206 may be presented, as shown in FIG. 7B. Information 618 comprises, by way of example only, books A, B, C, D and E, and is accompanied by a phrase "Your similar books." In some embodiments, the presented information may be a list of text strings, and the list may be scrolled by the user to present text strings of interest on the display. Though, it should be appreciated that any suitable information in different suitable textual, image and graphical format may be displayed on the user interface as the user navigates through the generated data sets.

Different user input may be received that relates to alternative ways of presenting items or ensembles of items from the generated data sets. As shown in FIG. 7B, selection of the similar task results in generation of an ensemble of five books, identified as books A, B, C, D and E displayed as part of information 618. In some scenarios, more than five similar books may be contained within the data generated by task models associated with the "similar" task. User input to view an alternative ensemble of books may be received in any suitable way. In some scenarios, user input may specify that the entire ensemble be replaced with a new ensemble. Though, a device may support a user interface mechanism by which an ensemble of items that complete a task is replaced by an ensemble that contains some of the items in the previous ensemble and some new items. User input may be provided to specify which items are retained and which items are replaced. For example, user input may be received with respect to one or more of the items that are to be retained on user interface while the rest of the displayed items is replaced by different items. In this example, user input 620 indicating "pinning down" book C is received. To indicate that the book C is "pinned down," a block representing the book C is schematically shown in FIG. 7B as surrounded by a bold frame. The rest of the books, books A, B, D and E, are not "pinned down" and may therefore be replaced by other books when a suitable user input is received. The user input instructing to "spin" the current selection of "similar" books, except book C, may be a shaking of computing device, a swiping motion across the display or any other suitable input.

FIG. 7C illustrates that a suitable user input instructing to "spin" the current selection of "similar" books may be received. Such input may be received, as just one example, by an accelerometer within computing device 105 that outputs a signal indicating shaking of device 105. In response, information 622 representing an alternative set of "similar" books, E, F, C, G and H, may be presented to the user. Because book C was "pinned down," as shown in FIG. 7B, information 622 includes book C in the same position relative to other book replacing books in previously presented information 618. The "pinning down" of items is also described below in connection with FIGS. 10A and 10B.

Figure 8:
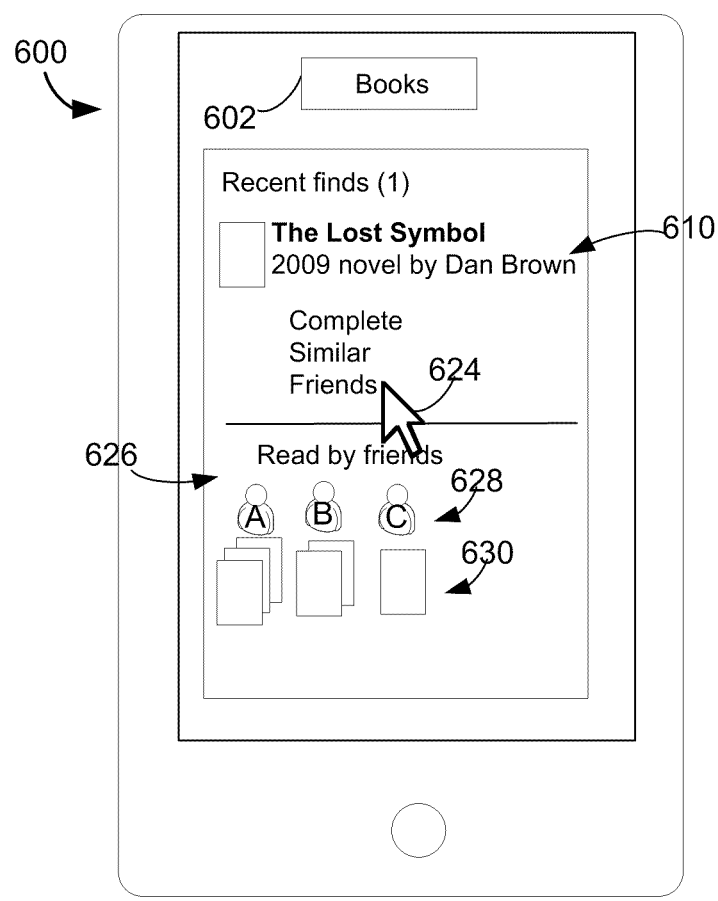

As another nonlimiting example of data that may be presented to the user by the information retrieval and presentation system when the user requests information in books, FIG. 8 illustrates a scenario where the user selects the task "Friends," as schematically shown in an arrow 624. In response, the information retrieval and presentation system may present information 626 "Read by friends" that indicates which "friend(s)" 628 of the user's "friends" have read the "Lost Symbol" novel by Dan Brown. In this example, a list of user's "friends" 628 comprises "friends" of the user schematically shown as friends A, B and C. Each of "friends" A, B and C, identifying a certain person or another entity, is shown (630) as associated with books read by the "friend." Each "friend" may be associated with the user in any suitable manner. For example, like the user, the user's "friend" may also be a user of the information retrieval and presentation system in accordance with some embodiments of the invention and the two users may share certain information.

FIGS. 9A, 9B, 9C and 9D illustrate examples of employing the information retrieval and presentation system to present, on a graphical user interface 900, information in response to a user's request for information on digital cameras.

These examples may illustrate a scenario in which, for example, the user identifies an item of interest, in this example, a digital camera, while searching (e.g., at a shopping trip) for a related product. The information retrieval and presentation system may formulate a search query about a particular digital camera, send the query to a server (e.g., server 106), and get back information about that particular digital camera and a collection of similar digital cameras and/or accessories for the digital camera. The information may be selected from a large body of data located on the server or other data sources. The manner in which other digital cameras are identified as "similar" to the digital camera of interest to the user may include similarity in relation to one or more criteria, such as a price, weight, battery life, preferences expressed by other users with a similar user profile (e.g., sports photographer, a tourist, a bird-watcher, etc.), and in any other suitable manner.

Figure 9A:
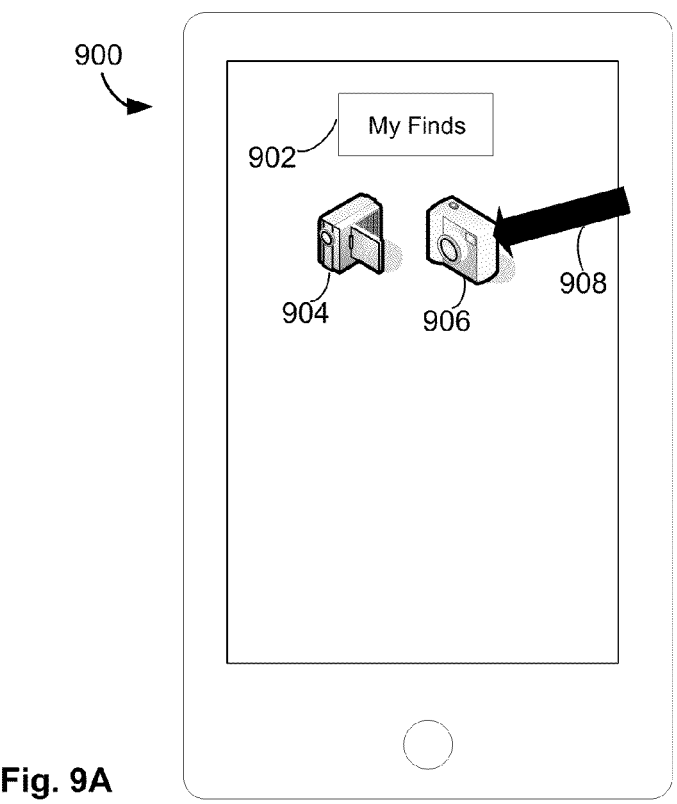
FIGS. 9A and 9B are diagrams illustrating as exemplary user interface that receives a request for information and displays data sets generated in response to the request for information.
Figure 9B:
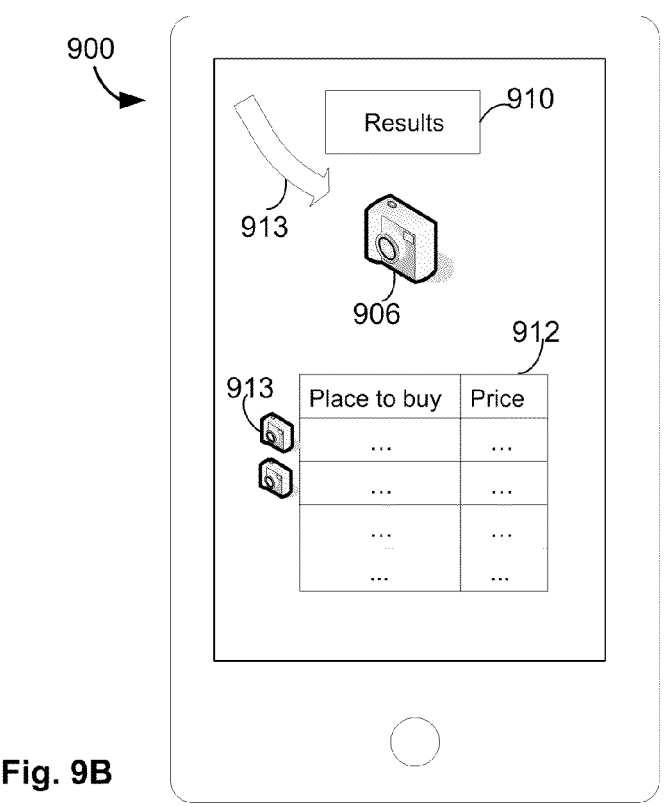

In FIG. 9A, items of interest to the user are displayed. The items may be related to products identified by the user as "My finds" 902. Though, the manner in which the system enters the state illustrated in FIG. 9A is not critical to the invention. In this example, the items correspond to two different digital cameras 904 and 906, which are shown as respective images. The user's "My finds" 902 collection of items may comprise items "found" by user in any suitable way. For example, the user may provide information on the items by typing in names of products. Alternatively, the user may obtain an image of a product (e.g., an actual image or a scan of a barcode of the product), with the image then being stored as part of user context information 206. Though, information on items in "My finds" 902 may be acquired in any other suitable way. A product may be identified based on any suitable characteristics, such as its manufacturer, brand, type, physical parameters or any other characteristics. Moreover, information on the items is not limited to information on products and may be information on services, geographical locations or any other suitable information.

Different user input may be received relating to a selection of items displayed on user interface 900. As indicated by an arrow 908 in FIG. 9A, the user input may be received indicating a selection of, in this example, digital camera 906. In response to the selection, a search query may be formulated and provided to the search engine 203, which then applies the search query to data available to the system such as over the Internet. Accordingly, in the example illustrated, in response to the search query comprising information on digital camera 906, results 912 may be provided.

In this example, the results 912 may represent data sets generated by a task model that generates buying information for an identified item. Accordingly, the results 912 may comprise places to buy digital camera 906 and/or accessories to digital camera 906 (e.g., a name and address and/or a website of a store) and a corresponding price of the digital camera at each of the places. Results 912 may include any suitable number of entries, each of which may be data set generated by the task model. Any other information related to digital camera 906 may be presented as results 912 as well. For example, an image 913 of the digital camera 906 and/or accessories to digital camera 906 may be presented along with information on each place to buy the digital camera.

User interface 900 may comprise any suitable controls or control mechanisms that facilitate user's interaction with the user interface. For example, a swiping motion, as indicated by arrow 913 across a touch sensitive screen in the vicinity of display item 910, indicating buying results are displayed, may be interpreted by computing device 105 as user input to illustrate alternative tasks that may be performed based on context that includes a display of digital camera 906 on user interface 900. As one example, a swiping motion across element 910 may result in the user being presented with options for tasks that generate information relating to comparing camera 906 to other cameras or to completing an ensemble of items that would naturally be used together, including camera 906.

Figure 9C:
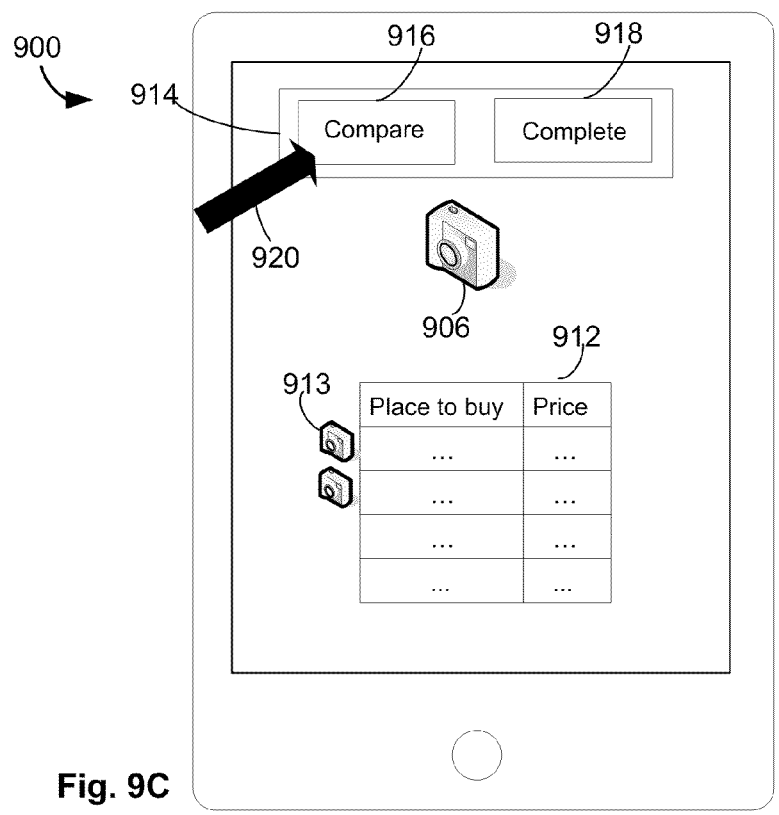
FIGS. 9C and 9D are diagrams illustrating an exemplary user interface through which a user may navigate though data sets generated in response to a request for information.

FIG. 9C illustrates user interface 900 after a user has made such a swiping motion. Results 912 may be presented to the user in a manner that allows the user to access further information on each of the entries on results 912 and perform suitable actions. For example, the user may be enabled to purchase digital camera 906 from a selected place. The purchase may be performed via computing device 105 (i.e., via the Internet).

It should be appreciated that the information retrieval and presentation system enables the user to provide any suitable input at any time of the user's interaction with the system. For example, the user may "pivot" digital camera 906 to select a different digital camera to be focus of the user's interest at any time.

Accordingly, the user may be presented with alternative tasks 914 with respect to digital camera 906. Tasks 914 may comprise, for example, the task "Compare" 916 and the task "Complete" 918. Though, any other suitable tasks may be presented to the user. If the user selects the task "Compare" 916, as schematically shown by an arrow 920, information on different digital cameras may be presented on user interface 900. Such information may be generated by a task model that generates data relevant to comparison of cameras, whether based on price, performance or any other desired characteristics.

Alternatively, a user may select "Complete," and in response, the information retrieval and presentation system may identify a task model that generates data sets, each constituting an ensemble of items that may be used in conjunction with camera 906.

Figure 9D:
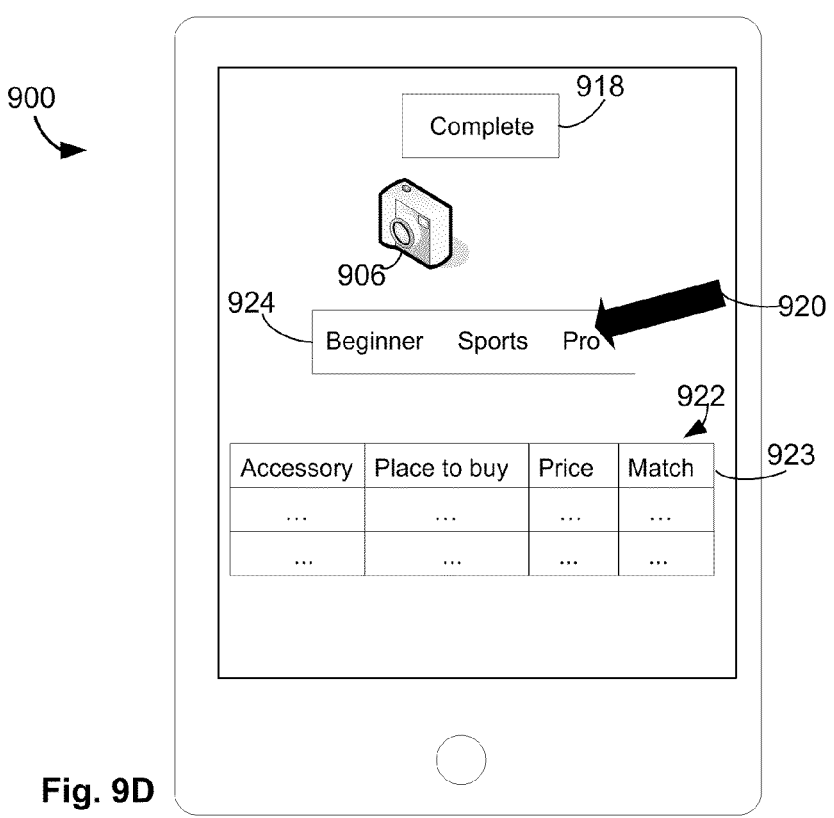

As shown in FIG. 9D, information 922 may comprise a name of the accessory, its place to buy and a price at that place, as well as a "match" 923 which may be a score denoting a degree of similarity of an item represented by information associated with the score and a set of criteria, which in this example are reflected as a model, defining items to be in the selected data sets.

As part of selecting the "Complete" task, a user may have an option to select a goal. The user may be presented with alternative goals of completing the task. As a result, as the user selects a goal of the alternative goals, different ensembles of items may be presented to the user that complete the task given the selected goal.

Accordingly, as shown in FIG. 9D, the user may be presented with alternative goals 924 of completing the task "Complete" 918. In FIG. 9D, goals 924 may comprise "Beginner" indicating a beginner photographer, "Sports" indicating a sports photographer and "Pro" indicating a professional photographer. The user may provide a suitable input indicating a selection of a goal from goals 924. An ensemble of items may then be presented to the user in response to the selection of the goal. In this example, when the user has selected the goal "pro," the "match" score may indicate the degree to which, according to a metric 320 (FIG. 3) included within a task model associated with the "pro" goal is suitable for use by a professional photographer.

As discussed above, in some embodiments, a user may navigate though data sets generated in response to a user's request for information. For example, the user may select different sets of items from the generated data sets be presented on a display. Each of the sets of items may complete a task relating to the user's request for information.

Figure 10A:
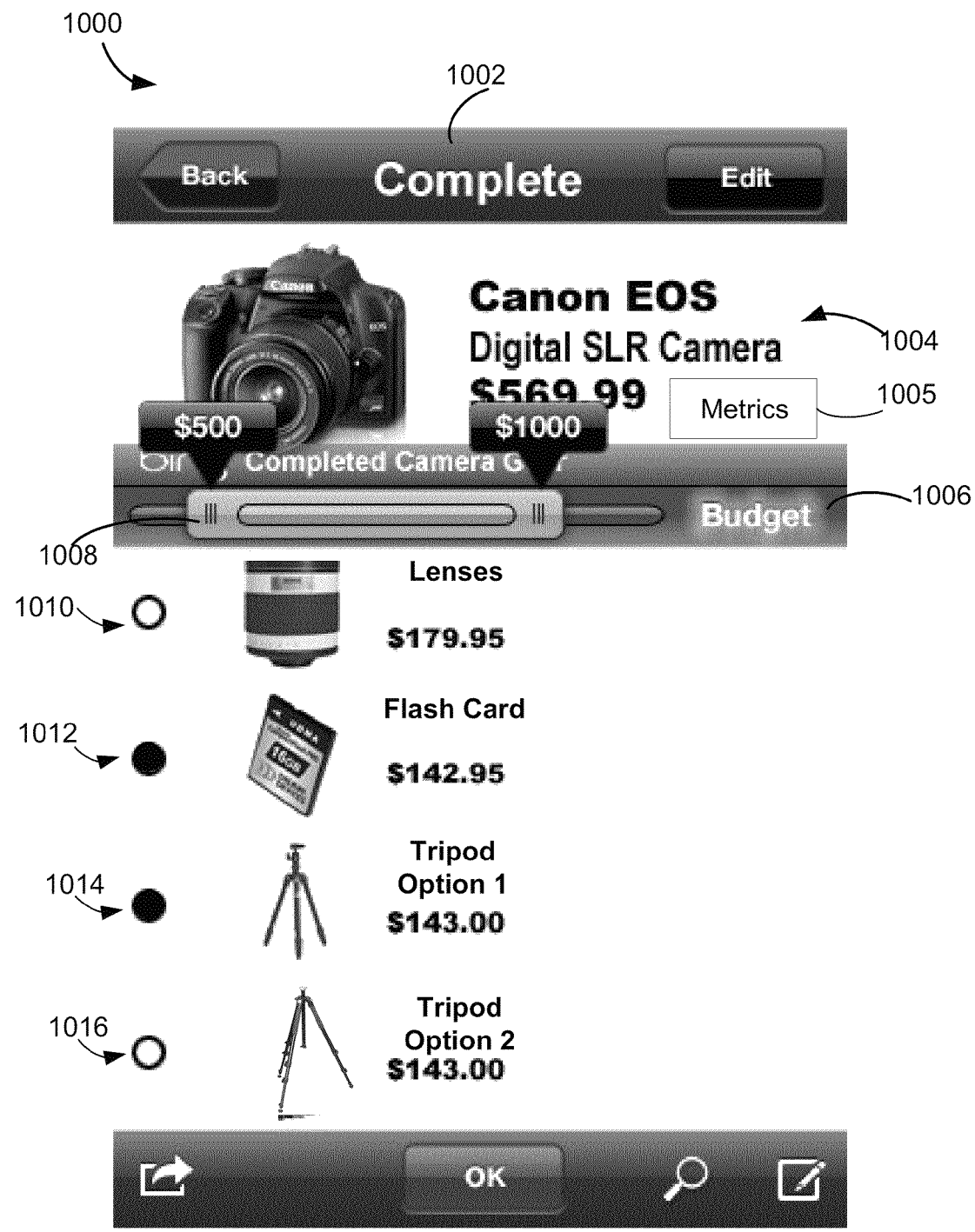
FIGS. 10A and 10B are diagrams illustrating an exemplary user interface of a potable electronic device through which a user may navigate though data sets generated in response to a request for information.
Figure 10B:
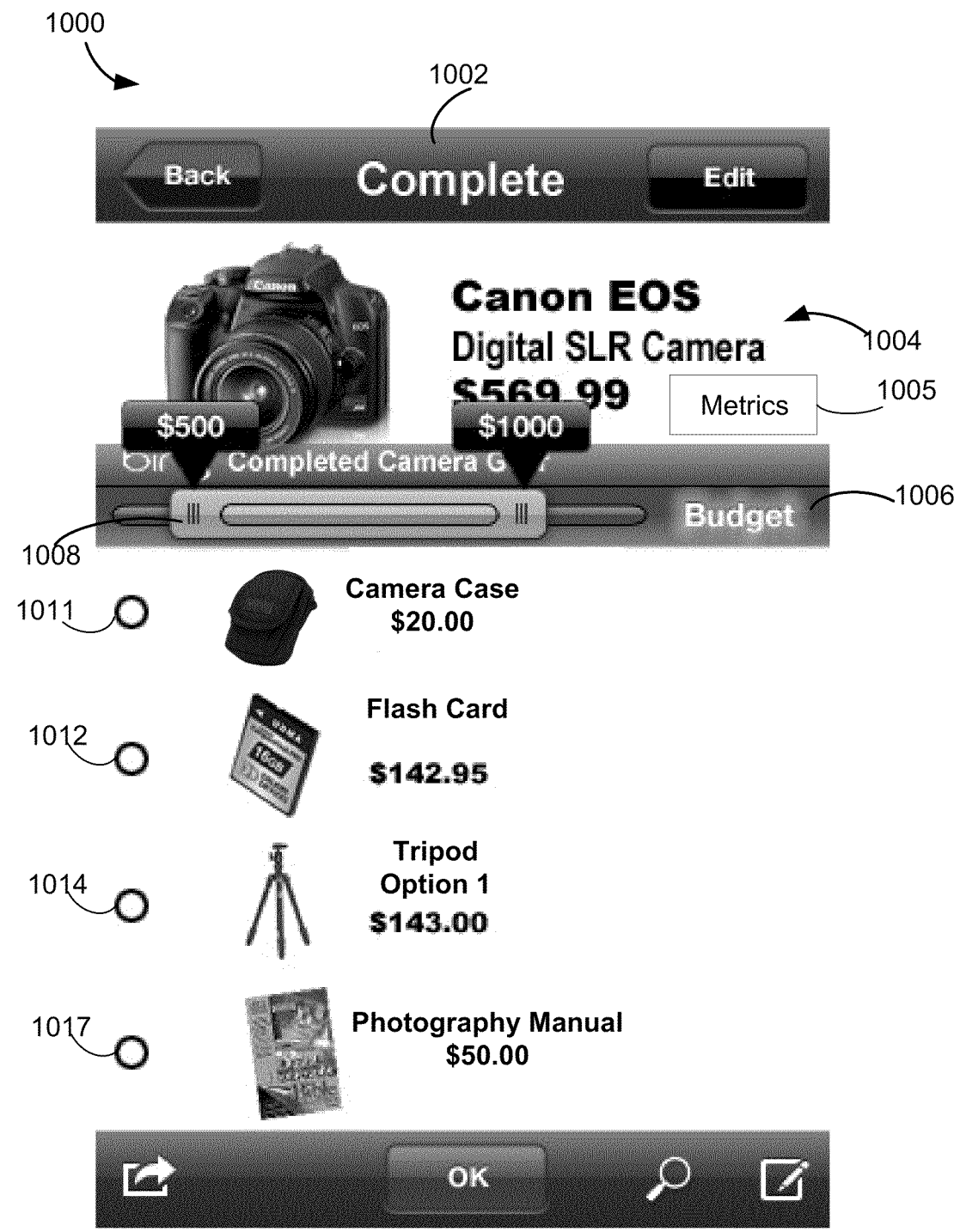

In some scenarios, when information, such as an ensemble or a portion of an ensemble of items is provided in response to the user's request for information, the user may be interested in some of the items, while desire alternative or different items be presented instead of certain items. Accordingly, in some embodiments, the user input with respect to retaining one more items displayed on the display may be received. FIGS. 10A and 10B illustrate examples of "pinning down" of certain items displayed on the user interface and "spinning" available items from the generated data sets to replace the rest of the currently displayed items. The "spinning" may be performed in any suitable way. For example, a technique including a randomization aspect may be used to randomly select items to replace currently displayed items that are not marked as "pinned down." Furthermore, the currently displayed items may be replaced by other items of the same or different types. The items that replace the currently displayed items upon the "spinning" satisfy the selected task and goal.

FIG. 10A shows an exemplary user interface 1000 such as the one that may be provided on a user computing device 105 (FIG. 1). User interface 1000 may be rendered on a display of any suitable portable electronic device, such as computing device 105 (FIG. 1).

In the example illustrated, a task 1002 is "Complete" and task 1002 comprises a request for information on a digital camera. For example, the user may desire to purchase a digital camera. As shown in the example illustrated, information 1004 on a digital camera is displayed on user interface 1000. Information 1004 comprises a manufacturer (in this example, Canon®) and a type of the digital camera and an image of the camera. In this example, information 104 is part of the context information used to identify a task and generate data sets with an appropriately selected task model.

In some embodiments, the "Complete" task may be used to present a collection of items in which the user of an item of interest may be interested as well. It should be appreciated that information 1004 on the digital camera is shown in FIG. 10A by way of example only as the user input with respect to any item, service, or information may be received. For example, the user input may comprise a request for information on a geographical location, a patient in a hospital setting or shopping-related data. As another example, the "Complete" task may have different effects in different contexts. In a context in which a user is shopping for a consumer good, the "Complete" task may have the effect illustrated in FIG. 10A. In other contexts, the "Complete" task may be mapped to a different task model and may therefore have a different effect. For example, in some scenarios, the user present at a certain geographical location may request a shopping plan and route that is based on the user's geographical location and available stores that may have items of interest to the user.

Furthermore, FIG. 10A illustrates that a task may be completed in different ways depending on a goal of competing the task. In this example, the goal 1006 comprises a "Budget" that relates to a price for the digital camera and accessories for the digital camera. Hence, information on different digital camera(a) and related accessories may be provided to the user depending on the specified budget. Furthermore, in some embodiments, the selection of the digital camera may be "fixed," and different accessories may be provided to the user depending on the specified budget.

To set a different budget, user interface 1000 provides a sliding scale 1008 that enables to receive a user input with respect to a range of prices for accessories about which the user desires to receive information. The information entered through control 106 that specifies a budget may be applied in any suitable way to generate an ensemble of items in accordance with the specified goal. For example, different budget ranges specified through control 1006 may map to different task models adapted for selecting items of different price ranges. Alternatively, the information entered through control 1006 may become part of user context information 206 and may be accessed to determine whether a data set generated by application of a model is consistent with a criteria specified in that model.

The user interface 1000 may comprise any additional controls suitable to accept user input, including conventional controls such an "OK" button, an "Edit" button, a "Back" button and any other suitable controls which are not accompanied by numerical references for the sake of clarity of representation. It should be appreciated that other controls may be provided on user interface 1000 even though they are not shown in this example. For example, a scroll bar may be provided to scroll down an ensemble of items displayed on user interface 1000 when a list of items in the ensemble exceeds a size of the screen of computing device 105.

As shown in FIG. 10A, information on accessories 1010, 1012, 1014 and 1016 for the digital camera is displayed on user interface 1000 as respective images and description of the accessory (i.e., a name and a price). Though, it should be appreciated that any suitable information on the accessories may be presented.

Data sets generated to achieve, or complete, a task may achieve, or complete, the task to a different degree. Accordingly, in some embodiments, a measure of how well a data set completes a task may be presented to the user along with the data set. This may facilitate user's assessment of the results of the search thus improving user experience.

As shown in FIG. 10A, user interface 1000 may comprise metrics 1005 that indicates how well the ensemble of items comprising accessories 1010, 1012, 1014 and 1016 (and any other accessories that may not fit on the display) complete the "Complete" task. Metrics 1005 may comprise data attributes may be any suitable attributes and may comprise, for example, a merit score of how well each collection completes the task. In the example illustrated, examples of data attributes in metrics 1005 may comprise "a percentage difference from a target price of an ensemble," "a number of constraints denoted as critical in the model that were satisfied," or any other suitable ways of assessment of a quality of completing the task.

In this example, the value indicated as part of metrics 105 may be computed by application of metrics 320 (FIG. 3) associated with the selected task model. Though, the value may be generated in any suitable way.

User input may be received with respect to one or more of the items that are to be retained on user interface 1000 while the rest of the displayed items are replaced by different items. In this example, items 1012 and 1014 are schematically shown as "pinned down" on user interface 1000 by selecting a respective radio button located in proximity to each of the items 1012 and 1014. Though, it should be appreciated that items displayed on user interface 1000 may be selected to be "pinned down" in any suitable manner as embodiments of the invention are not limited in this respect.

To "spin" the items which are not selected by "pinning down"—in this example, lenses 1010 and tripod 1016—computing device 105 may receive any suitable user input. For example, the user input may be a swiping motion across the display, a shaking motion of computing device 105 or any other suitable input.

As shown in FIG. 10B, after items 1012 and 1014 were "pinned down" and the remaining items 1010 and 1016 were "spun," items 1010 and 1016 are replaced by different items 1011 and 1017, respectively. Thus, lenses 1010 are replaced by a camera case 1011 and tripod 1016 is replaced by photography manual 1017. In this example, no user input is provided with respect to an alternative selection of task 1002 and/or goal 1006. However, it should be appreciated that, in some scenarios, while the user "pins down" certain displayed items, the user input may be received with respect to a selection of a different task and/or goal.

It should be appreciated that items in FIGS. 10A and 10B are illustrated by way of example only and any suitable ensembles of items may be displayed in response to user input comprising a request for information. Further, in the examples illustrated, items 1010 and 1016 which were not "pinned down," as show in FIG. 10A, are replaced with items of different types. It should be noted that, in FIG. 10A, items 1014 and 1016 are shown as labeled, along with a type of the accessory for the digital camera (a "tripod"), with an "option 1" or an "option 2." The options notation indicates that, different types (e.g., with respect to a manufacturer, physical dimensions and other parameters) of the same items may be displayed. Moreover, if an item is replaced on the display, it may be replaced with an item of the same type, which is thus being another "option" of the replaced items.

Having thus described several aspects of at least one embodiment of this invention, it is to be appreciated that various alterations, modifications, and improvements will readily occur to those skilled in the art.

For example, embodiments have been described in which information is presented through user interface based on identifying data sets that contain data about items that solve a set of constraints. In some embodiments, there may be a "reverse solving" step in which the user may choose a collection of items and the system may—e.g. by inverse solving of a system of linear equations, or by a hill climbing technique known in the art as a Newton-Raphson method—suggest the one or more tasks that could be wholly or partly completed by the selected items. In embodiments in which the set of constraints are represented by task models, this reverse solving may entail selecting a task model or models for which the identified set of items solves, at least to a suitable degree, the set of constraints represented in the task model. Such a solution may be used in presenting information to a user in any suitable way. For example, the identified task may be suggested to the user or other information selected based on recognition that they user is interested in a particular task. Alternatively or additionally, the system may automatically perform, or may suggest to the user, actions relevant for performing such a task.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets [also touch-responsive display screens; direct-interaction displays; multi-touch displays that respond to two or more fingers on the screen at the same time]. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed by servers comprising and/or cooperating with a search engine, the method for providing search results to a user, the method comprising:
 with at least one processor:
  accessing a first data store storing a plurality of user contexts for respective users of the search engine;
  selecting a context for the user, the context comprising information specifically about the user;
  accessing a collection of pre-defined task models, each pre-defined task model comprising respective criteria and comprising respective attributes that are independent of any user and of any query and that characterize a data set, wherein the pre-defined task model specifies one or more data set operations to be performed on a given data set to which the predefined task model is being applied, each of the data set operations comprising a rule, a constraint, or a calculation, and when generating or modifying the given data the data set operations are performed to generate or modify the given data set ;
  automatically selecting from among the collection of pre-defined task models, based on a user context associated with the user, a plurality of task models, the plurality of task models selected based on their respective criteria being satisfied by the context, the plurality of task models including at least one task model that has a plurality of associated goals;
receiving a search string inputted or selected by the user using a client device communicating through a network with the servers or the search engine;
performing a search, via the search engine, for the search string using the selected task models and goals to generate respective data sets that are specific to the search string and the user; and
providing, via the network, to the client device, indicia of the data sets, such that at the client device the user is enabled to interact with the indicia to alternately display the data sets.

2. The method of claim 1, further comprising receiving different user interactions with the indicia and in response providing to the client device, for display thereby, different of the corresponding data sets at different times.

3. The method of claim 1, further comprising generating the context, the generating the context comprising:
receiving a user input indicative of a selection of a first item from a plurality of items presented by the client device;
storing first information, relating to the first item, in the context information;
collecting third information generated in response to a request, initiated by the user, for information on a second item, wherein the request for the information on the second item is received by the search engine, the search engine generating the third information; and
storing the third information in the context information; and
identifying at least one task model that describes a subset of items from the plurality of items.

4. The method of claim 3, further comprising storing second information in the context information, the second information corresponding to output from a sensor, wherein the sensor comprises either a camera, a microphone, a compass, a motion detector, or a global positioning system device.

5. The method of claim 1, wherein the indicia of the data sets includes indicia of the goals and user interaction with the indicia of the goals selects a data set associated with a goal.

6. An information-presentation system, comprising:
one or more servers, each server comprising a respective processor, storing a context associated with a user, the context comprising information about context of the user derived from user interaction with a search engine, the context obtained from a plurality of contexts of respective users;
the one or more servers storing a plurality of pre-defined task models, each pre-defined task model comprising respective criteria and comprising attributes that are independent of any user and of any query and that characterize a data set, wherein the pre-defined task model comprises a set of equations or a set of inequalities, and, when generating a given data set, the generating comprises solving the set of equations or the set of inequalities for the given data set;
the one or more servers storing a mapping, the mapping defining associations between each of a plurality of patterns of data within the contexts and the task models, respectively;
the one or more servers applying the mapping to the context to identify, by applying the patterns of data to the context, target task models applicable to the user based on the context;
the one or more servers generating data sets based on the target task models, respectively, by using each target task model to search, via a search engine, for items corresponding to a search term inputted by the user;
the one or more servers:
sending, to a user-interface device, indicia of the target task models;
receiving, from the user-interface device, user selections of the target task models;
responsive to receiving the selections corresponding to the target task models, sending to the user-interface device, to be displayed thereon, the data sets generated by the search engine that correspond to the selected task models, respectively.

7. The system of claim 6, wherein:
the one or more servers generate at least a portion of a data set by sending a search query to the search engine, the search query being based on a selected target task model.

8. The system of claim 7, further comprising: a context-management component, executed by the one or more servers, receiving data associated with the user and updating the context according to the received data.

9. The system of claim 8, wherein the data associated with the user comprises sensor data from a portable electronic device associated with the user.

10. The system of claim 6, wherein each of the pre-defined task models is associated with an identified task and one of the pre-defined task models comprises a plurality of rules, equations, constraints and/or computations that collectively define characteristics of data applicable to completion of the identified task.

11. The system of claim 6, wherein at least a portion of the plurality of pre-defined task models comprises pre-defined task models relating to tasks involved in shopping.

12. The system of claim 6, wherein the one or more servers modify the mapping based on user feedback to at least one data set generated based on a selected task model.

13. A method of enabling a computing device to present information to a user, the method comprising:
obtaining information identifying the user, and selecting, from a plurality of contexts of respective users, according to the information identifying the user, a context corresponding to the user;
accessing a plurality of pre-defined tasks, each pre-defined task comprising respective criteria and comprising attributes that are independent of any user and of any query and that characterize a data set, each pre-defined task further comprising operations configured to generate or modify arbitrary data sets;
providing the context to an information retrieval system, and receiving from the information retrieval system an indication of target tasks, the target tasks selected from among the pre-defined tasks according to the context and the criteria of the tasks;
providing a first user interface comprising indicia of the target tasks, and receiving user interactions with the first user interface that select tasks from among the target tasks;
providing indications of the selected tasks to the information retrieval system, and in response receiving data sets from the information-retrieval system, the data sets generated by execution of the selected tasks according to a search term inputted by the user, the data sets completing the selected tasks; and
providing a second user interface identifying the data sets as completing the selected tasks, the second user interface comprising control elements with which the user may selectively display, one at a time, different of the data sets.

14. The method of claim 13, further comprising:
in response to user input received through the second user interface, changing a display on the portable electronic device to change a data set of the data sets visible on the display.

15. The method of claim 13, wherein the providing the first user interface step further comprises presenting a list of items each identifying a respective task of the plurality of tasks.

16. The method of claim 13, further comprising:
caching the plurality of data sets; and
displaying at each of a plurality of different times, different portions of the data from the plurality of data sets from the cached plurality of data sets.

17. The method of claim 13, wherein the obtaining information indicative of the context comprises acquiring an image.

* * * * *